United States Patent
Hanson et al.

(10) Patent No.: US 11,378,093 B2
(45) Date of Patent: *Jul. 5, 2022

(54) THROAT DISTRIBUTION FOR A ROTOR AND ROTOR BLADE HAVING CAMBER AND LOCATION OF LOCAL MAXIMUM THICKNESS DISTRIBUTION

(71) Applicant: HONEYWELL INTERNATIONAL INC., Charlotte, NC (US)

(72) Inventors: David Richard Hanson, Tempe, AZ (US); John A. Gunaraj, Chandler, AZ (US); Jeffrey Hayes, Apache Junction, AZ (US); Nick Nolcheff, Chandler, AZ (US); John Repp, Gilbert, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/060,219

(22) Filed: Oct. 1, 2020

(65) Prior Publication Data

US 2021/0207614 A1 Jul. 8, 2021

Related U.S. Application Data

(63) Continuation of application No. 16/198,279, filed on Nov. 21, 2018, now Pat. No. 10,859,094.

(51) Int. Cl.
*F01D 5/14* (2006.01)
*F04D 29/38* (2006.01)
*F04D 29/32* (2006.01)

(52) U.S. Cl.
CPC ........... *F04D 29/384* (2013.01); *F01D 5/141* (2013.01); *F04D 29/324* (2013.01); *F05D 2240/304* (2013.01)

(58) Field of Classification Search
CPC ...... F04D 29/324; F04D 29/29; F04D 29/384; F01D 5/141; F05D 2240/304
See application file for complete search history.

(56) References Cited

U.S. PATENT DOCUMENTS

| | | | |
|---|---|---|---|
| 5,326,221 A | 7/1994 | Amyot et al. | |
| 6,036,438 A | 3/2000 | Imai | |

(Continued)

FOREIGN PATENT DOCUMENTS

| | | |
|---|---|---|
| DE | 29825097 U1 | 3/2005 |
| DE | 102016124152 A1 | 6/2017 |

(Continued)

OTHER PUBLICATIONS

Mohammed Amine Chelabi, et al., "Effects of Cone Angle and Inlet Blade Angle on Mixed Inflow Turbine Performances," Periodica Polytechnica. Mechanical Engineering, vol. 61, No. 3, Jun. 29, 2017, p. 225, XP055429918.

(Continued)

*Primary Examiner* — Ninh H. Nguyen
(74) *Attorney, Agent, or Firm* — Lorenz & Kopf, LLP

(57) ABSTRACT

A rotor for a compressor includes a hub and a plurality of airfoils having a root, a tip opposite the root and a span that extends from 0% at the root to 100% at the tip. Each of the airfoils is coupled to the hub at the root and is spaced apart from adjacent ones of the airfoils over the span by a throat dimension. The throat dimension has a maximum value at a spanwise location between 60% of the span and 90% of the span of the adjacent ones of the airfoils. The throat dimension between 90% of the span and the tip of the adjacent ones of the plurality of airfoils has a first value that is less than 70% of the maximum value.

18 Claims, 29 Drawing Sheets

(56) References Cited

U.S. PATENT DOCUMENTS

| | | |
|---|---|---|
| 7,048,509 B2 | 5/2006 | Tominaga et al. |
| 8,967,959 B2 | 3/2015 | Stein et al. |
| 8,998,577 B2 | 4/2015 | Gustafson et al. |
| 9,879,539 B2 | 1/2018 | Lentz |
| 9,957,804 B2 | 5/2018 | Chouhan et al. |
| 9,957,805 B2 * | 5/2018 | Soni ................. F01D 5/141 |
| 10,544,681 B2 * | 1/2020 | Liskiewicz ......... F01D 5/141 |
| 10,633,989 B2 * | 4/2020 | Jaiswal ............. F01D 5/141 |
| 10,859,094 B2 * | 12/2020 | Hanson ............ F04D 29/384 |
| 2016/0177723 A1 | 6/2016 | Lohaus et al. |
| 2017/0175530 A1 | 6/2017 | Soni et al. |

FOREIGN PATENT DOCUMENTS

| | | |
|---|---|---|
| EP | 1710397 A2 | 10/2006 |
| EP | 1754859 A2 | 2/2007 |
| EP | 0887513 B1 | 7/2007 |
| EP | 1422382 B1 | 2/2010 |
| GB | 2431697 A | 5/2007 |
| JP | 2000045703 A | 2/2000 |
| JP | 201415858 A | 1/2014 |
| WO | 2008109037 A1 | 9/2008 |
| WO | 2011040241 A1 | 4/2011 |

OTHER PUBLICATIONS

Hai et al., Sensitive Flutter Parameters Analysis with Respect to Flutter-Free Design of Compressor Blade, Procedia Engineering, Dec. 2015, pp. 39-45, vol. 99, AVIC Shenyang Engine Design and Research Institute, Shenyang, China.

* cited by examiner

THROAT DISTRIBUTION FOR A ROTOR AND ROTOR BLADE HAVING CAMBER AND LOCATION OF LOCAL MAXIMUM THICKNESS DISTRIBUTION

CROSS-REFERENCE TO RELATED APPLICATION

This application is a continuation of U.S. patent application Ser. No. 16/198,279 filed on Nov. 21, 2018. The relevant disclosure of the above application is incorporated herein by reference.

TECHNICAL FIELD

The present disclosure generally relates to gas turbine engines, and more particularly relates to a rotor having a throat distribution that results in increased flow capacity, and a rotor blade for a rotor having a camber distribution that reduces flutter and a location of local maximum thickness distribution that provides robustness.

BACKGROUND

Gas turbine engines may be employed to power various devices. For example, a gas turbine engine may be employed to power a mobile platform, such as an aircraft. Generally, gas turbine engines include compressor and fan axial rotors, which are operable to increase the static pressure of the gas flowing within the gas turbine engine or to draw air into the gas turbine engine, respectively. Thus, typically, compressor and fan axial rotors are designed to enable large flow capacity, while being subject to packaging, weight, performance, operability, and durability constraints. In certain instances, in order to enable a large flow capacity, compressor and fan rotors may be subject to reduced efficiency, reduced flutter margin and reduced robustness.

Further, rotor blades for use with rotors, such as compressors or fan axial rotors for a gas turbine engine powering a mobile platform, may be subject to weight constraints. In certain instances, reducing a weight of the rotor blade may result in airfoils with lower natural vibratory frequencies that tend to flutter more easily. In addition to the intended working gas flows, components of the gas turbine engine may, in certain instances, encounter foreign object(s) during operation. In these instances, the components of the gas turbine engine may be required to continue to operate after this encounter or may be required to shut down safely. In the example of a rotor blade for a fan axial rotor, the rotor blade may be required to withstand the encounter with minimal permanent deformation. Generally, in order to ensure the rotor blade withstands the encounter, an airfoil of the rotor blade may have an increased overall thickness to provide robustness to the airfoil. The increased overall thickness, however, increases the weight of the airfoil, and thus, the rotor blade, which is undesirable for the operation of the gas turbine engine.

Accordingly, it is desirable to provide a rotor, such as a compressor or fan axial rotor, with a throat distribution that provides large flow capacity without reducing efficiency of the rotor and without reducing a flutter margin. Moreover, it is desirable to provide a rotor blade that has a reduced weight and a camber distribution that results in a reduced tendency to flutter. Further, it is desirable to provide a rotor blade that has a location of local maximum thickness distribution that reduces the weight of the rotor blade and maintains high efficiency, while providing robustness to the rotor blade should the rotor blade encounter a foreign object during operation. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a rotor for a compressor. The rotor includes a hub and a plurality of airfoils having a root, a tip opposite the root and a span that extends from 0% at the root to 100% at the tip. Each of the plurality of airfoils is coupled to the hub at the root and is spaced apart from adjacent ones of the plurality of airfoils over the span by a throat dimension defined between the adjacent ones of the plurality of airfoils. The throat dimension has a maximum value at a spanwise location between 60% of the span and 90% of the span of the adjacent ones of the plurality of airfoils, and at 10% of the span of the adjacent ones of the plurality of airfoils above or below the spanwise location of the maximum value, the throat dimension is less than 97% of the maximum value. The throat dimension at 5% of the span of the adjacent ones of the plurality of airfoils is less than 70% of the maximum value.

Further provided according to various embodiments is a rotor for a compressor. The rotor includes a hub and a plurality of airfoils having a root, a tip opposite the root and a span that extends from 0% at the root to 100% at the tip. Each of the plurality of airfoils is coupled to the hub at the root and is spaced apart from adjacent ones of the plurality of airfoils over the span by a throat dimension defined between the adjacent ones of the plurality of airfoils. The throat dimension has a maximum value at a spanwise location between 60% of the span and 90% of the span of the adjacent ones of the plurality of airfoils, and at 10% of the span of the adjacent ones of the plurality of airfoils above and below the spanwise location of the maximum value, the throat dimension is less than 97% of the maximum value. The throat dimension between 90% of the span and the tip of the adjacent ones of the plurality of airfoils has a first value, and the throat dimension between the root and 10% of the span of the adjacent ones of the plurality of airfoils has a second value that is less than 60% of the maximum value.

Also provided is a rotor for a compressor. The rotor includes a hub and a plurality of airfoils having a root, a tip opposite the root and a span that extends from 0% at the root to 100% at the tip. Each of the plurality of airfoils is coupled to the hub at the root and is spaced apart from adjacent ones of the plurality of airfoils over the span by a throat dimension defined between the adjacent ones of the plurality of airfoils. The throat dimension has a maximum value at a spanwise location between 60% of the span and 90% of the span of the adjacent ones of the plurality of airfoils, and at 10% of the span of the adjacent ones of the plurality of airfoils above and below the spanwise location of the maximum value, the throat dimension is less than 97% of the maximum value. The throat dimension between 90% of the span and the tip of the adjacent ones of the plurality of airfoils has a first value, the throat dimension between the root and 10% of the span of the adjacent ones of the plurality of airfoils has a second value that is less than 70% of the maximum value and the second value is less than the first value.

According to various embodiments, provided is a rotor blade for a compressor of a gas turbine engine. The rotor blade includes an airfoil that extends from a root to a tip and has a leading edge and a trailing edge. The airfoil has a span that extends from 0% at the root to 100% at the tip and a mean camber line that extends from the leading edge to the trailing edge. The airfoil includes a total camber distribution that increases from the root to a maximum value of total camber between 5% of the span and 20% of the span.

Also provided is a rotor blade for a compressor of a gas turbine engine. The rotor blade includes an airfoil that extends from a root to a tip and has a leading edge and a trailing edge. The airfoil has a span that extends from 0% at the root to 100% at the tip and a mean camber line that extends from the leading edge to the trailing edge. The airfoil includes a total camber distribution of a total camber of the mean camber line. The total camber has a first value at the root, a maximum value between 5% of the span and 20% of the span and the total camber has a second value at the tip, which is less than the first value and the maximum value.

Further provided is a rotor for a compressor of a gas turbine engine. The rotor includes a hub and an airfoil extending from a root to a tip and having a leading edge and a trailing edge. The airfoil is coupled to the hub at the root, the airfoil having a span that extends from 0% at the root to 100% at the tip and a mean camber line that extends from the leading edge to the trailing edge. The airfoil has a total camber distribution of a total camber of the mean camber line. The total camber has a first value at the root, a maximum value between 5% of the span and 20% of the span and the total camber distribution decreases from the maximum value to at least 80% of the span of the airfoil.

According to various embodiments, a rotor blade for a compressor of a gas turbine engine is provided. The rotor blade includes an airfoil extending from a root to a tip and having a leading edge and a trailing edge. The airfoil has a span that extends from 0% at the root to 100% at the tip and a mean camber line that extends from the leading edge to the trailing edge. The airfoil has a location of local maximum thickness defined as a ratio of a first arc distance along the mean camber line between the leading edge and a position of the local maximum thickness to a total arc distance along the mean camber line from the leading edge to the trailing edge. A value of the ratio increases from the root to a first position value, decreases from the first position value to a second position value and increases from the second position value to the tip. The first position value is at a spanwise location within 20% to 50% of the span.

Also provided is a rotor blade for a compressor of a gas turbine engine. The rotor blade includes an airfoil extending from a root to a tip and having a leading edge and a trailing edge. The airfoil has a span that extends from 0% at the root to 100% at the tip and a mean camber line that extends from the leading edge to the trailing edge. The airfoil has a location of local maximum thickness defined as a ratio of a first arc distance along the mean camber line between the leading edge and a position of the local maximum thickness to a total arc distance along the mean camber line from the leading edge to the trailing edge. A value of the ratio increases from a position value at the root to a first position value, decreases from the first position value to a second position value and increases from the second position value to a third position value at the tip. The second position value is within 60% to 90% of the span.

Further provided is a rotor for a compressor of a gas turbine engine. The rotor includes a hub and an airfoil extending from a root to a tip and having a leading edge and a trailing edge. The airfoil has a span that extends from 0% at the root to 100% at the tip and a mean camber line that extends from the leading edge to the trailing edge. The airfoil has a location of local maximum thickness defined as a ratio of a first arc distance along the mean camber line between the leading edge and a position of the local maximum thickness to a total arc distance along the mean camber line from the leading edge to the trailing edge. A value of the ratio increases from a position value at the root to a first position value, decreases from the first position value to a second position value and increases from the second position value to a third position value at the tip. The position value is an absolute minimum value of the ratio over the span of the airfoil and the second position value is at a spanwise location within 60% to 90% of the span.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
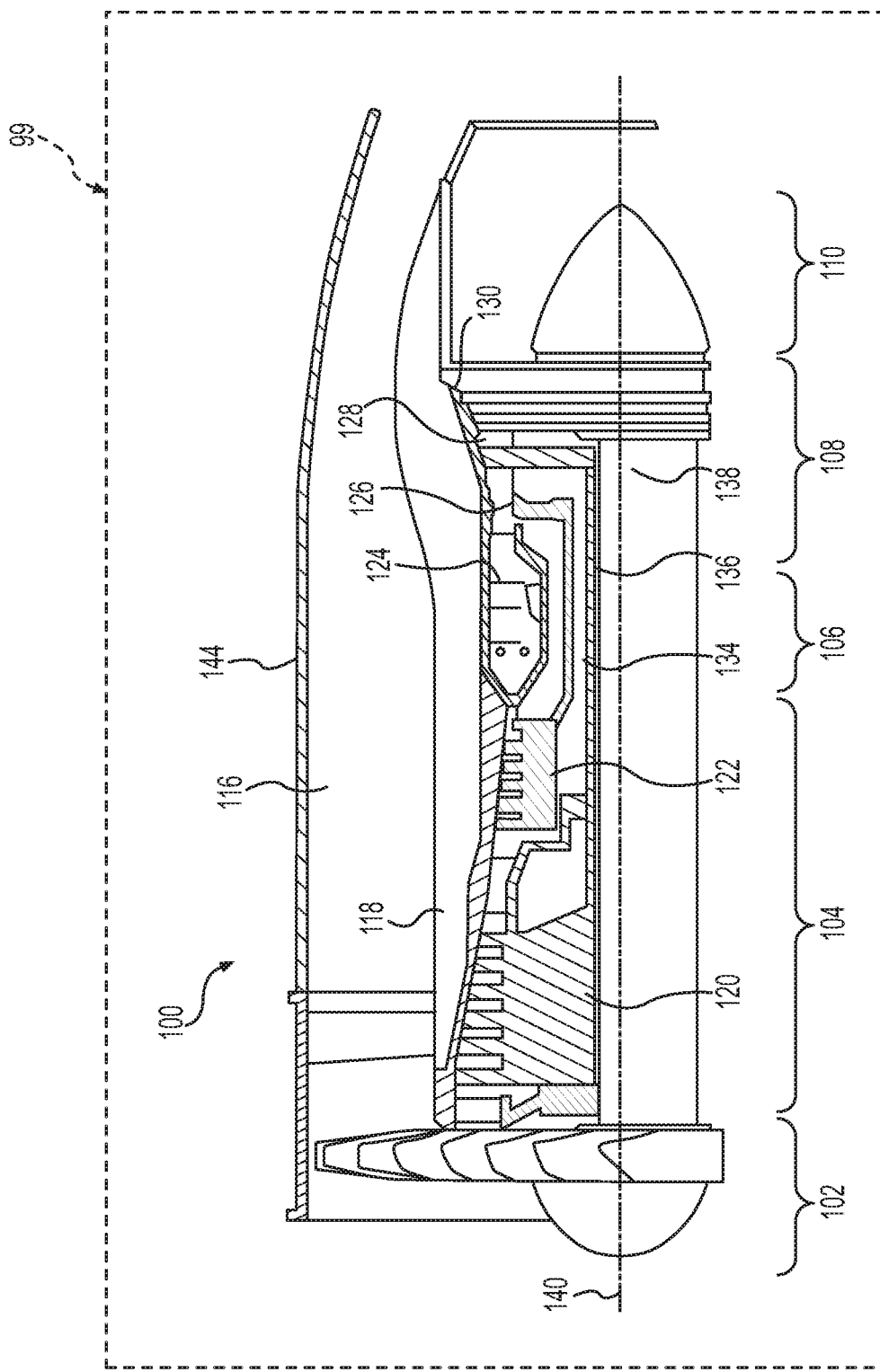
FIG. 1 is a schematic cross-sectional illustration of a gas turbine engine, which includes an exemplary rotor and rotor blade in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of rotor that would benefit from an increased flow capacity without reducing efficiency or flutter margin, and the rotor described herein for a compressor or fan axial rotor is merely one exemplary embodiment according to the present disclosure. Further, those skilled in the art will appreciate that embodiments of the present disclosure may be practiced in conjunction with any type of blade that would benefit from a reduced weight without reducing flutter margin, and the rotor blade described herein for use with a compressor or fan axial rotor is merely one exemplary embodiment according to the present disclosure. Moreover, those skilled in the art will appreciate that embodiments of the present disclosure may be practiced in conjunction with any type of blade that would benefit from an increased robustness without increasing the weight of the blade, and the rotor blade described herein for use with a compressor or fan axial rotor is merely one exemplary embodiment according to the present disclosure. In addition, while the rotor and rotor blade are described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a partial, cross-sectional view of an exemplary gas turbine engine 100 is shown with the remaining portion of the gas turbine engine 100 being generally axisymmetric about a longitudinal axis 140, which also comprises an axis of rotation for the rotating components in the gas turbine engine 100. In the depicted embodiment, the gas turbine engine 100 is an annular multi-spool turbofan gas turbine jet engine within an aircraft 99, although other arrangements and uses may be provided. As will be discussed herein, with brief reference to FIG. 2, the gas turbine engine 100 includes a rotor 200 including a plurality of rotor blades 204 that have a throat distribution or throat dimension distribution. By providing the throat dimension distribution of the present disclosure, the rotor 200 has an increased flow capacity while maintaining an efficiency and flutter margin of the rotor 200. In one example, the flow capacity of the rotor 200 may be increased by about 2% or more as compared to a conventional rotor. As will be discussed herein, with brief reference to FIG. 11, the gas turbine engine 100 also includes the rotor 200, which may include a plurality of rotor blades 300, with each of the rotor blades 300 having a total camber distribution 302 that reduces flutter. The rotor blade 300 of FIG. 11 reduces a susceptibility to flutter by modifying the mode shape of the rotor blade 300, which changes a fundamental vibratory mode of the rotor blade 300. As discussed with regard to FIGS. 11-17, the rotor blade 300 has a mode shape that is modified to be less susceptible to flutter by decreasing a total camber of the rotor blade 300 near and at a root of the rotor blade 300. With brief reference to FIG. 19, the gas turbine engine 100 includes the rotor 200, which may include a plurality of rotor blades 500, with each of the rotor blades 500 having a location of local maximum thickness distribution 502 that provides robustness to foreign object encounters without increasing a weight of the rotor blades 500. In addition, the location of local maximum thickness distribution provides robustness without reducing the flow capacity and efficiency of the rotor 200. Stated another way, by providing each of the rotor blades 500 with the location of local maximum thickness distribution, the rotor blades 500 have material positioned where it may reduce permanent deformation due to foreign object encounters, without increasing the weight of the rotor blades 500 or reducing flow capacity or efficiency of the rotor 200. Further, it should be understood that while the rotor blades 204, 300, 500 are described and illustrated herein as comprising separate and discrete rotor blades 204, 300, 500, each of the rotor blades 300, 500 may be arranged to have the throat dimension distribution of the rotor blades 204. Moreover, each of the rotor blades 300 may include the location of local maximum thickness distribution as discussed with regard to the rotor blades 500, and each of the rotor blades 500 may include the total camber distribution 302 discussed with regard to the rotor blades 300. Thus, the rotor 200 may include a plurality of rotor blades which include one or more of a throat dimension distribution for increased flow capacity, a total camber distribution for increased flutter margin and a location of local maximum thickness distribution for improved robustness without a weight increase.

In this example, with reference back to FIG. 1, the gas turbine engine 100 includes fan section 102, a compressor section 104, a combustor section 106, a turbine section 108, and an exhaust section 110. In one example, the fan section 102 includes the rotor 200 having a plurality of rotor blades 204, 300, 500, which draw air into the gas turbine engine 100 and accelerate it. A fraction of the accelerated air exhausted from the rotor 200 is directed through an outer (or first) bypass duct 116 and the remaining fraction of air exhausted from the rotor 200 is directed into the compressor section 104. The outer bypass duct 116 is generally defined by an inner casing 118 and an outer casing 144. In the embodiment of FIG. 1, the compressor section 104 includes an intermediate pressure compressor 120 and a high pressure compressor 122. However, in other embodiments, the number of compressors in the compressor section 104 and the configuration thereof may vary. One or more of the intermediate pressure compressor 120 and the high pressure compressor 122 may also include the rotor 200. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the rotor 200 via a low pressure shaft 138.

Rotor Throat Distribution

Figure 2:
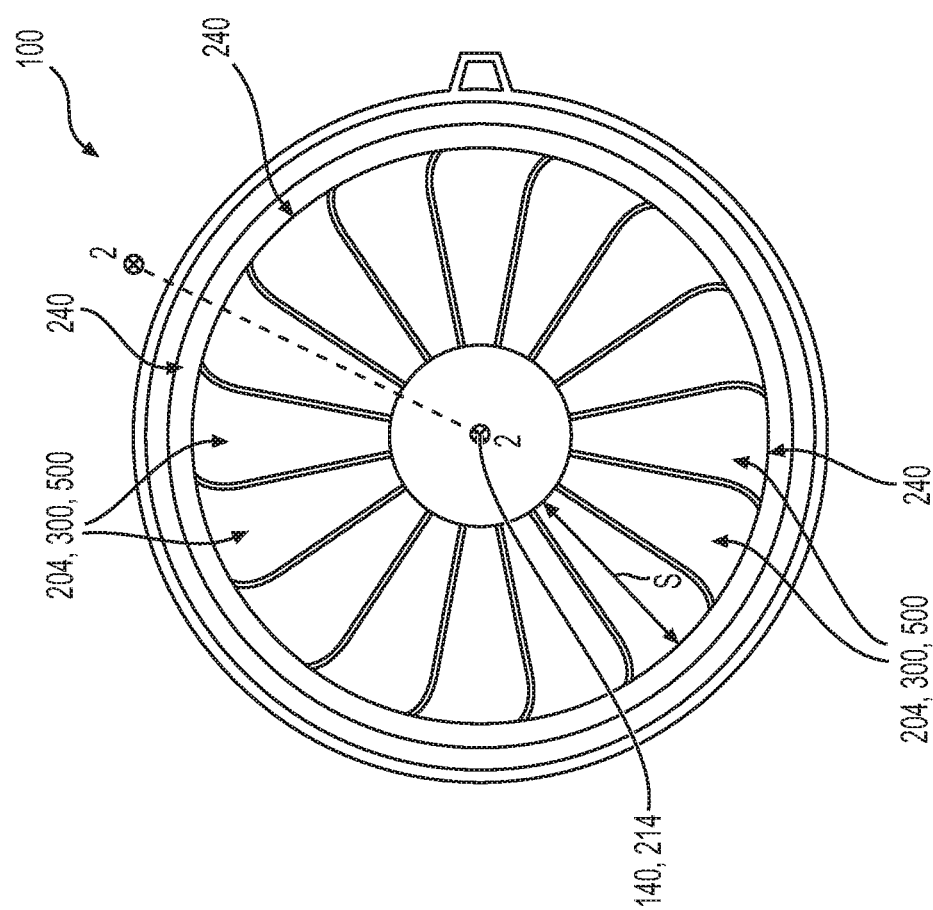
FIG. 2 is a front view of a rotor of a fan section of the gas turbine engine of FIG. 1, in which the rotor has a throat distribution that results in increased flow capacity and includes a rotor blade that has a total camber distribution that reduces flutter and a location of local maximum thickness distribution that provides robustness to foreign object encounters.
Figure 3:
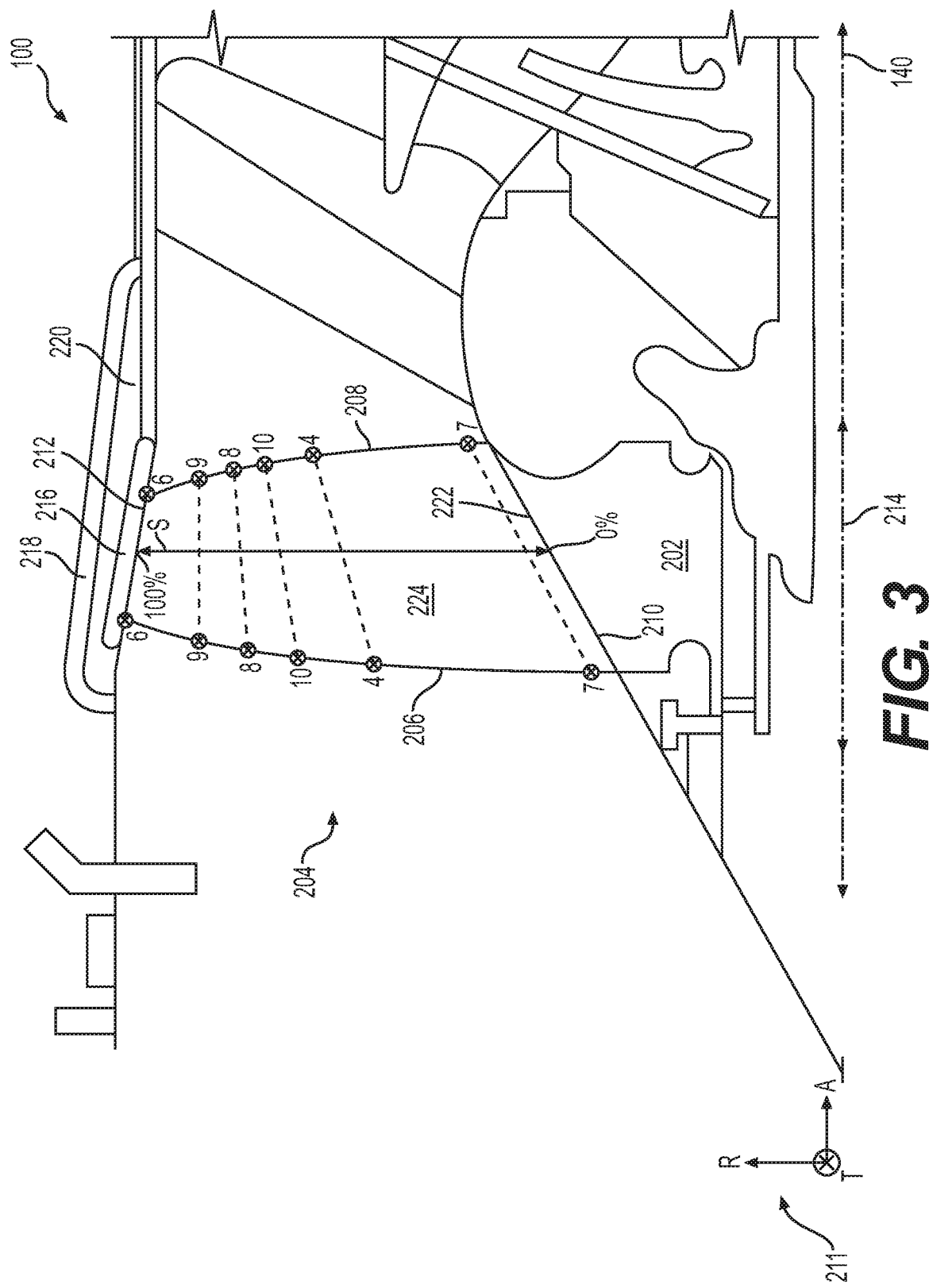
FIG. 3 is a schematic cross-sectional view of the rotor of FIG. 2, taken along line 2-2 of FIG. 2, which illustrates one of the rotor blades associated with the rotor of FIG. 2, in which the rotor has a throat distribution that results in increased flow capacity.

With reference to FIG. 2, the rotor 200 is shown in greater detail. In the example of FIG. 2, the rotor 200 is a fan axial rotor. The rotor 200 includes a rotor disk 202 and in this example, the plurality of rotor blades 204, 300, 500. With reference to FIG. 3, one of the plurality of rotor blades 204 for use with the rotor 200 of the gas turbine engine 100 is shown. Each of the rotor blades 204 may be referred to as an "airfoil 204." The airfoils 204 extend in a radial direction (relative to the longitudinal axis 140 of the gas turbine engine 100) about the periphery of the rotor disk 202. The airfoils 204 each include a leading edge 206, an axially-opposed trailing edge 208, a base or root 210, and a radially-opposed tip 212. The tip 212 is spaced from the root 210 in a blade height, span or spanwise direction, which generally corresponds to the radial direction or R-axis of a coordinate legend 211 in the view of FIG. 3. In this regard, the radial direction or R-axis is radially outward and orthogonal to the axial direction or X-axis, and the axial direction or X-axis is parallel to the longitudinal axis 140 or axis of rotation of the gas turbine engine 100. A tangential direction or T-axis is mutually orthogonal to the R-axis and the X-axis.

As shown in FIG. 3, the span S of each of the airfoils 204 is 0% at the root 210 (where the airfoil 204 is coupled to a rotor hub 222) and is 100% at the tip 212. In this example, the airfoils 204 are arranged in a ring or annular array surrounded by a static fan shroud 216. The static fan shroud 216 is, in turn, circumscribed by an annular housing piece 218 defining a containment pocket 220. The airfoils 204 and the rotor disk 202 are generally composed of a metal, metal alloy or a polymer-based material, such as a polymer-based composite material. In one example, the airfoils 204 are integrally formed with the rotor disk 202 as a monolithic or single piece structure commonly referred to as a bladed disk or "blisk." In other examples, the airfoils 204 may be insert-type blades, which are received in mating slots provided around the outer periphery of rotor disk 202. In still further examples, the rotor 200 may have a different construction. Generally, then, it should be understood that the rotor 200 is provided by way of non-limiting example and that the rotor 200 (and the airfoils 204 described herein) may be fabricated utilizing various different manufacturing approaches. Such approaches may include, but are not limited to, casting and machining, three dimensional metal printing processes, direct metal laser sintering, Computer Numerical Control (CNC) milling of a preform or blank, investment casting, electron beam melting, binder jet printing, powder metallurgy and ply lay-up, to list but a few examples. Regardless of its construction, the rotor 200 includes a rotor hub 222 defining a hub flow path. The hub flow path extends over the outer surface of the rotor disk 202 and between the airfoils 204 to guide airflow along from the inlet end (inducer or leading edge) to the outlet end (exducer or trailing edge) of the rotor 200. As shown in FIG. 3, each of the plurality of airfoils 204 is coupled to the rotor hub 222 at the root 210 (0% span). It should be noted that while each of the plurality of airfoils 204 are illustrated herein as being coupled to the rotor hub 222 at an angle relative to the axial direction (A-axis), one or more of the plurality of airfoils 204 may be coupled to the rotor hub 222 along a straight line. Further, it should be noted that one or more of the plurality of airfoils 204 may be coupled to the rotor hub 222 along a complex curved surface. It should be noted that in the instances where the plurality of airfoils 204 are coupled to the rotor hub 222 at an angle, the span remains at 0% at the root 210. In other words, the span of each of the plurality of airfoils 204 remains at 0% at the root 210 regardless of the shape of the rotor hub 222.

Figure 4:
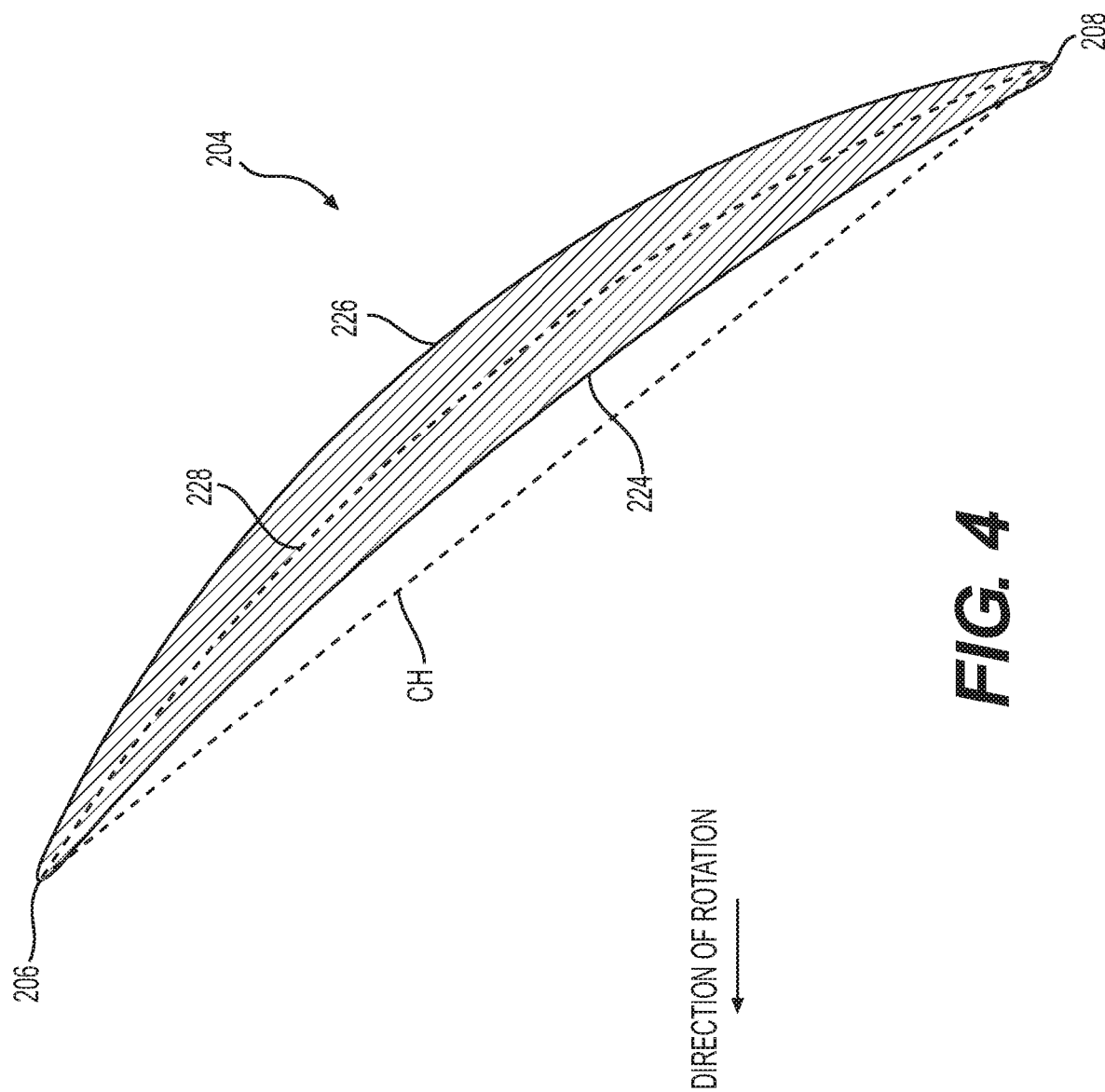
FIG. 4 is a cross-sectional view of the rotor blade of FIG. 3, taken along line 4-4 of FIG. 3.

With reference to FIG. 4, each of the airfoils 204 further includes a first principal face or a "pressure side" 224 and a second, opposing face or a "suction side" 226. The pressure side 224 and the suction side 226 extend in a chordwise direction along a chord line CH and are opposed in a thickness direction normal to a mean camber line 228, which is illustrated as a dashed line in FIG. 4 that extends from the leading edge 206 to the trailing edge 208. The pressure side 224 and the suction side 226 extend from the leading edge 206 to the trailing edge 208. In one example, each of the airfoils 204 is somewhat asymmetrical and cambered along the mean camber line 228. The pressure side 224 has a contoured, generally concave surface geometry, which gently bends or curves in three dimensions. The suction side 226 has a contoured, generally convex surface geometry, which likewise bends or curves in three dimensions. In other embodiments, the airfoils 204 may not be cambered and may be either symmetrical or asymmetrical.

Figure 5:
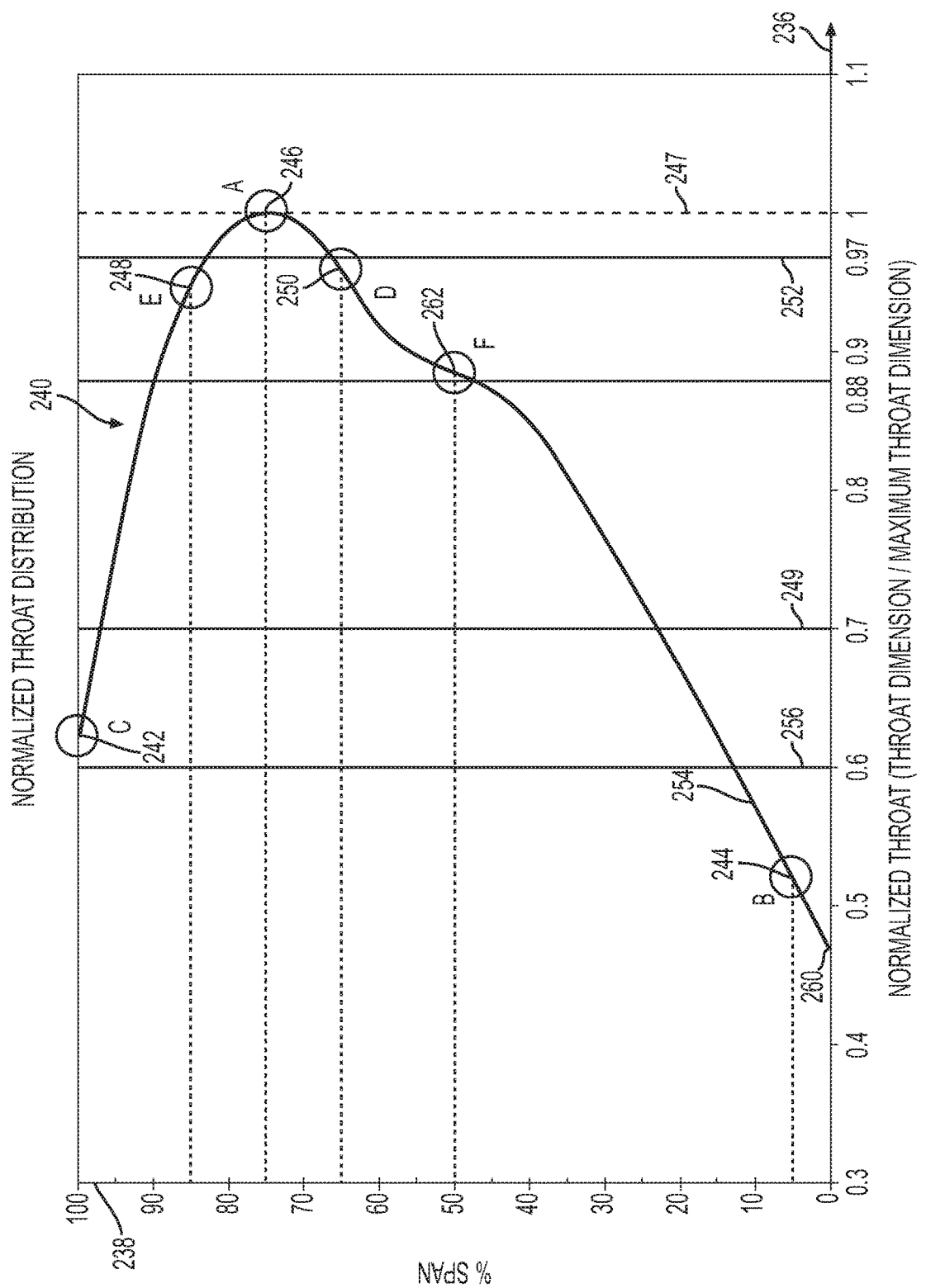
FIG. 5 is a graph of normalized throat (throat dimension divided by maximum throat dimension; abscissa) versus percent span (ordinate) illustrating a spanwise throat distribution associated with the rotor of FIG. 2.

With reference back to FIG. 2, as shown, the rotor 200 includes multiple airfoils 204, 300, 500 which are spaced about a rotor rotational axis 214. The rotor rotational axis 214 is substantially parallel to and collinear with the longitudinal axis 140 of the gas turbine engine 100. In the example of the airfoils 204, each one of the airfoils 204 is spaced apart from an adjacent one of the plurality of airfoils 204 by a throat dimension distribution 240, which varies along the span S of the airfoils 204. As used herein "throat dimension" is defined as a minimum physical distance between adjacent airfoils 204 at a particular spanwise location or a particular location along the span of the adjacent airfoils 204. In one example, with reference to FIG. 5, a graph shows the variation of the normalized throat dimension distribution 240 along the span S of the airfoils 204. In FIG. 5, the abscissa or horizontal axis 236 is a normalized value of the throat dimension, which is normalized by dividing the throat dimension at the particular spanwise location by a maximum throat dimension (maximum value 246) between adjacent ones of the airfoils 204 along the entirety of the span of the airfoils 204 (and the normalized throat dimension may be multiplied by 100 to arrive at a percentage of the maximum value 246); and the ordinate or vertical axis 238 is the spanwise location or location along the span of the adjacent airfoils 204 (span is 0% at the root 210 (FIG. 3) and span is 100% at the tip 212 (FIG. 3)). In one example, the normalized value of the throat dimension ranges from about 0.46 to 1, with 1 representing the location of the maximum value 246 for the throat dimension.

Figure 6:
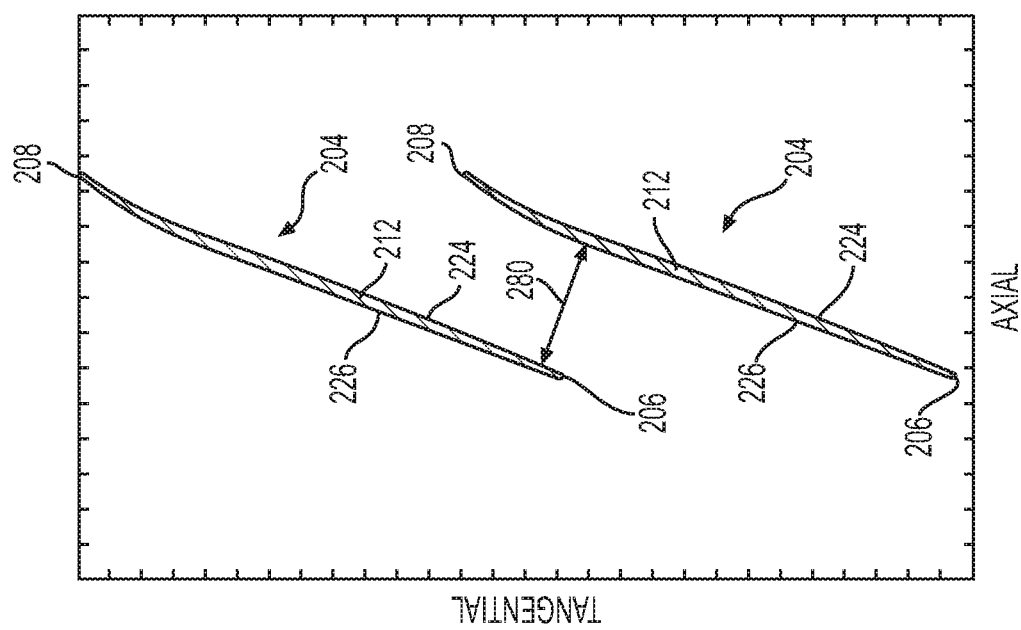
FIG. 6 is a cross-sectional view of two adjacent rotor blades of the rotor of FIG. 2, taken along an arc length (tangential direction) of the rotor starting from line 6-6 of FIG. 3, which illustrates a first value for the throat dimension at a spanwise location between 90% and 100% of the span of the rotor blades.

As shown in FIG. 5, the throat dimension between 90% of the span and 100% of the span of the adjacent ones of the plurality of airfoils 204 has a first value 242. In one example, the first value 242 is about 0.5 (50%) to about 0.7 (70%) of the maximum value 246 of the throat dimension distribution 240. With reference to FIG. 6, a first throat dimension 280 is shown as defined between adjacent ones of the airfoils 204. FIG. 6 is a cross-sectional view through two adjacent airfoils 204, taken along an arc length (in the tangential direction or along the T-axis) of the rotor 200 starting from line 6-6 of FIG. 3 into the page. As shown in FIG. 6, the first throat dimension 280 of the throat dimension distribution 240 is defined as the minimum physical distance between the two airfoils 204 at a spanwise location between 90% of the span and 100% of the span, and in the example of FIG. 6 the first throat dimension 280 is at the tip 212 or 100% span. The first throat dimension 280 is divided by the maximum value 246 to obtain the first value 242, and the first value 242 is less than the maximum value 246.

With reference back to FIG. 5, the throat dimension between 0% of the span and 20% of the span of the adjacent ones of the plurality of airfoils 204 has a second value 244.

Figure 7:
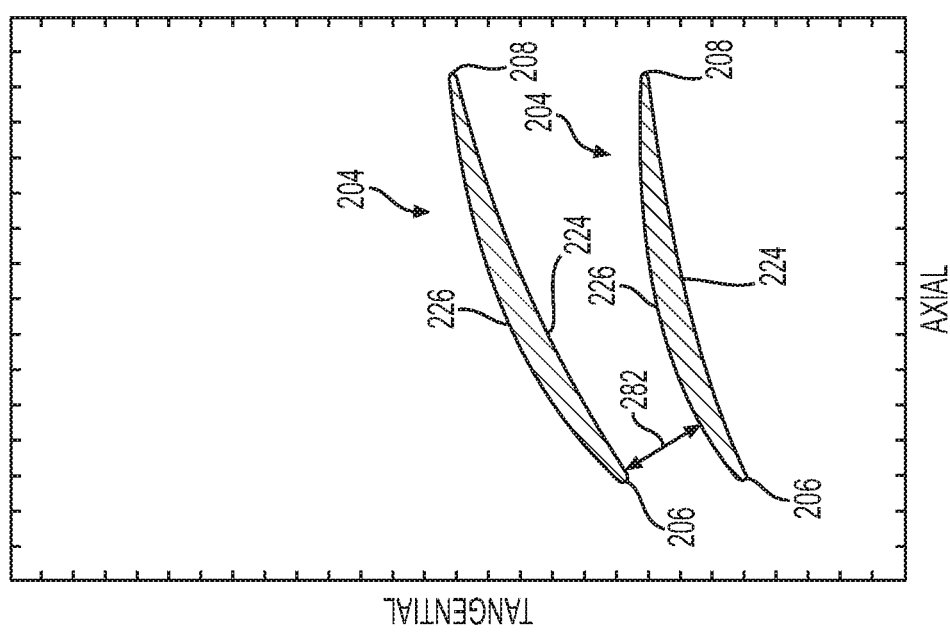
FIG. 7 is a cross-sectional view of two adjacent rotor blades of the rotor of FIG. 2, taken along an arc length (tangential direction) of the rotor starting from the perspective of line 7-7 of FIG. 3, which illustrates a second value for the throat dimension at a spanwise location between 0% and 10% of the span of the rotor blades.

The second value 244 is less than the first value 242 and is less than the maximum value 246. In one example, the second value 244 is about 0.4 (40%) to about 0.7 (70%) of the maximum value 246 of the throat dimension distribution 240. With reference to FIG. 7, a second throat dimension 282 is shown as defined between adjacent ones of the airfoils 204. FIG. 7 is a cross-sectional view through two adjacent airfoils 204, taken along an arc length (in the tangential direction or along the T-axis) of the rotor 200 starting from line 7-7 of FIG. 3 into the page. As shown in FIG. 7, the second throat dimension 282 of the throat dimension distribution 240 is defined as the minimum physical distance between the two airfoils 204 at a spanwise location between 0% of the span and 20% of the span, and in the example of FIG. 7 the second throat dimension 282 is at about 5% span. The second throat dimension 282 is divided by the maximum value 246 to obtain the second value 244, and the second value 244 is less than 0.7 (70%) of the maximum value 246 of the throat dimension distribution 240. In one example, the second value 244 is at about 5% span and is less than 0.6 (60%) of the maximum value 246 of the throat dimension distribution 240.

Figure 8:
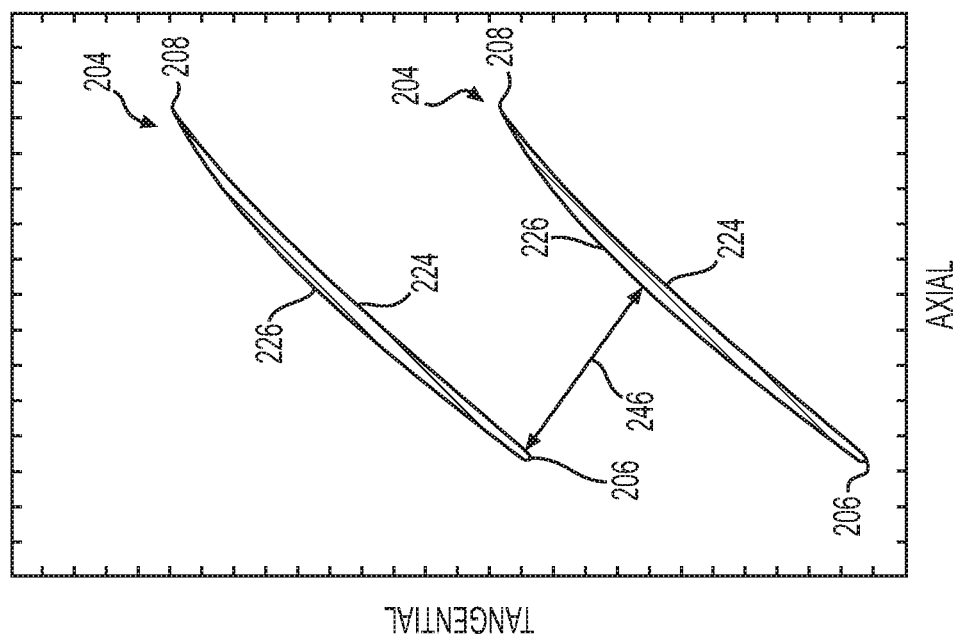
FIG. 8 is a cross-sectional view of two adjacent rotor blades of the rotor of FIG. 2, taken along an arc length (tangential direction) of the rotor starting from the perspective of line 8-8 of FIG. 3, which illustrates a maximum value for the throat dimension at a spanwise location between 60% and 90% of the span of the rotor blades.

With reference back to FIG. 5, in this example, the throat dimension has a maximum value 246 at a spanwise location between 60% of the span and 90% of the span of the adjacent ones of the plurality of airfoils 204. The maximum value 246 is an absolute maximum value for the throat dimension distribution 240. In one example, the maximum value 246 is located or defined at about 75% of the span. A dashed line 247 that extends from the maximum value 246 to the horizontal axis 236 is provided in FIG. 5 for ease of reference. The first value 242 is less than 70% of the maximum value 246. Line 249 that represents 70% of the maximum value 246 is provided in FIG. 5 for ease of reference. As the maximum value 246 is the largest value for the throat dimension distribution 240, the maximum value 246 of the normalized throat dimension is 1.0. With reference to FIG. 8, the maximum value 246 is shown as defined between adjacent ones of the airfoils 204. FIG. 8 is a cross-sectional view through two adjacent airfoils 204, taken along an arc length (in the tangential direction or along the T-axis) of the rotor 200 starting from line 8-8 of FIG. 3 into the page. As shown in FIG. 8, the maximum value 246 of the throat dimension distribution 240 is defined as the minimum physical distance between the two airfoils 204 at a spanwise location between 60% of the span and 90% of the span, and in the example of FIG. 8, the maximum value 246 is at about 75% span.

Figure 9:
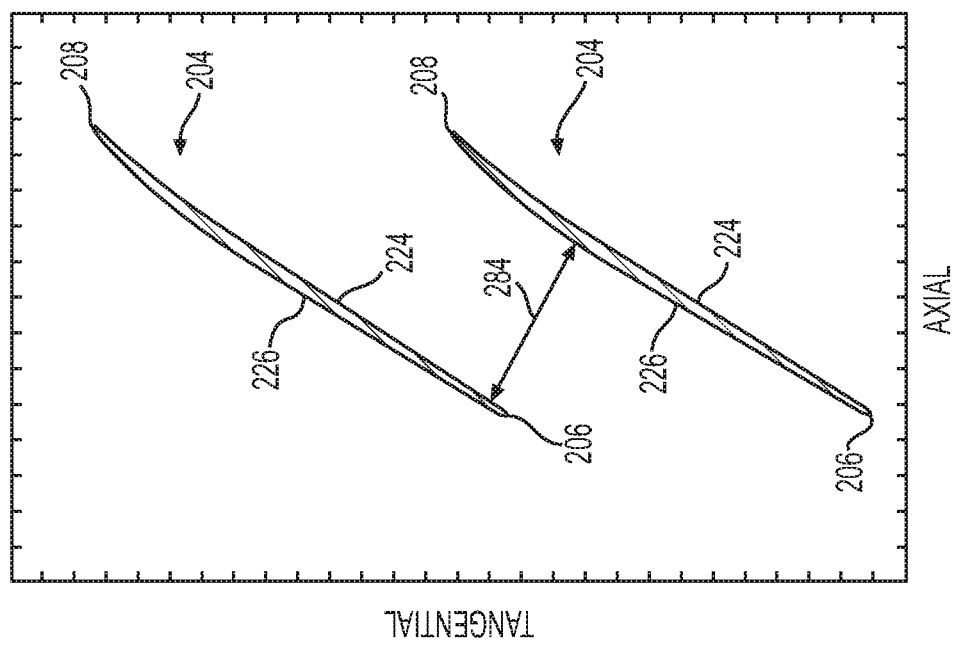
FIG. 9 is a cross-sectional view of two adjacent rotor blades of the rotor of FIG. 2, taken along an arc length (tangential direction) of the rotor starting from the perspective of line 9-9 of FIG. 3, which illustrates a third value for the throat dimension at a spanwise location that is 10% above the spanwise location of the maximum value for the throat dimension.

With reference back to FIG. 5, the throat dimension has a third value 248 at 10% of the span of the adjacent ones of the plurality of airfoils 204 above the spanwise location (toward the tip 212 or 100% span) of the maximum value 246. The third value 248 of the throat dimension at 10% of the span of the adjacent ones of the plurality of airfoils 204 above the spanwise location of the maximum value 246 is less than 97% of the maximum value 246 or has a normalized throat value that is less than 0.97. In other embodiments, the third value 248 of the throat dimension at 10% of the span of the adjacent ones of the plurality of airfoils 204 above the spanwise location of the maximum value 246 is less than 96% of the maximum value 246 or has a normalized throat value that is less than 0.96. In the example of the maximum value 246 at 75% span, the third value 248 is at 85% span. With reference to FIG. 9, a third throat dimension 284 is shown as defined between adjacent ones of the airfoils 204. FIG. 9 is a cross-sectional view through two adjacent airfoils 204, taken along an arc length (in the tangential direction or along the T-axis) of the rotor 200 starting from line 9-9 of FIG. 3 into the page. As shown in FIG. 9, the third throat dimension 284 of the throat dimension distribution 240 is defined as the minimum physical distance between the two airfoils 204 at a spanwise location at 10% span above the spanwise location of the maximum value 246, which in the example of FIG. 9 the third throat dimension 284 is at about 85% span. The third throat dimension 284 is divided by the maximum value 246 to obtain the third value 248.

Figure 10:
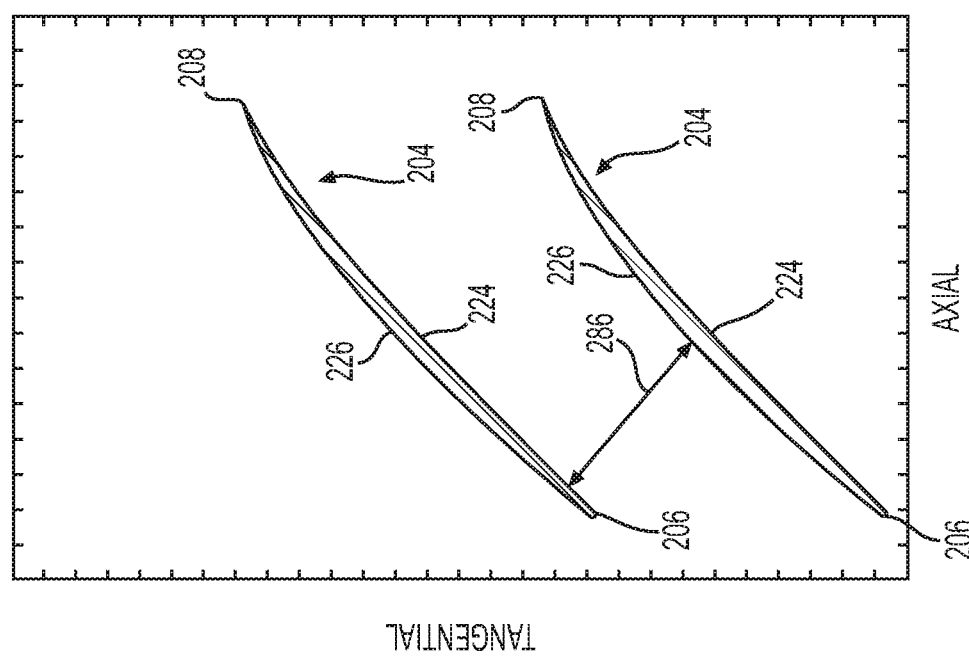
FIG. 10 is a cross-sectional view of two adjacent rotor blades of the rotor of FIG. 2, taken along an arc length (tangential direction) of the rotor starting from the perspective of line 10-10 of FIG. 3, which illustrates a fourth value for the throat dimension at a spanwise location that is 10% below the spanwise location of the maximum value for the throat dimension.

With reference back to FIG. 5, the throat dimension also has a fourth value 250 at 10% of the span of the adjacent ones of the airfoils 204 below the spanwise location (toward the root 210 or 0% span) of the maximum value 246. The fourth value 250 of the throat dimension at 10% of the span of the adjacent ones of the airfoils 204 below the spanwise location of the maximum value 246 is less than 97% of the maximum value 246 or has a normalized throat value that is less than 0.97. In other embodiments, the fourth value 250 of the throat dimension at 10% of the span of the adjacent ones of the plurality of airfoils 204 below the spanwise location of the maximum value 246 is less than 96% of the maximum value 246 or has a normalized throat value that is less than 0.96. In the example of the maximum value 246 at 75% span, the fourth value 250 is at 65% span. With reference to FIG. 10, a fourth throat dimension 286 is shown as defined between adjacent ones of the airfoils 204. FIG. 10 is a cross-sectional view through two adjacent airfoils 204, taken along an arc length (in the tangential direction or along the T-axis) of the rotor 200 starting from line 10-10 of FIG. 3 into the page. As shown in FIG. 10, the fourth throat dimension 286 of the throat dimension distribution 240 is defined as the minimum physical distance between the two airfoils 204 at a spanwise location at 10% span below the spanwise location of the maximum value 246, and in the example of FIG. 10 the fourth throat dimension 286 is at about 65% span. The fourth throat dimension 286 is divided by the maximum value 246 to obtain the fourth value 250.

Thus, at 10% of the span of the adjacent ones of the airfoils 204 above or below the spanwise location of the maximum value 246, the throat dimension is less than 97% of the maximum value 246, as shown in FIG. 5. Stated another way, the value of the throat dimension at 10% of the span of the adjacent ones of the airfoils 204 above or below the spanwise location of the maximum value 246 is reduced by at least 3% of the maximum value 246. Line 252 that represents 97% of the maximum value 246 is provided in FIG. 5 for ease of reference.

In addition, the throat dimension has a fifth value 254 at 10% of the span of the adjacent ones of the plurality of airfoils is less than 60% of the maximum value 246 of the throat dimension distribution 240 or has a normalized throat value that is less than 0.6. Line 256 that represents 60% of the maximum value 246 is provided in FIG. 5 for ease of reference.

With reference back to FIG. 5, the throat dimension between 40% of the span and 60% of the span of the adjacent ones of the plurality of airfoils 204 has a sixth value 262. The sixth value 262 is less than the third value 248 and is less than the fourth value 250. In one example, the sixth value 262 is about 0.8 to about 0.9 of the maximum value 246 of the throat dimension distribution 240. In this example, the sixth value 262 of the throat dimension distribution 240 is defined as the minimum physical distance between the two airfoils 204 at a spanwise location between 40% of the span and 60% of the span, which is divided by the maximum value 246, and in this example, the sixth value 262 is at a spanwise location that is about 25% less than the spanwise location of the maximum value 246. As shown in FIG. 5, the sixth value 262 is about 0.88 of the maximum value 246 of the throat dimension distribution 240 and is at a spanwise location of about 50% span when the maximum value 246 is at a spanwise location of about 75% span.

Figure 5A:
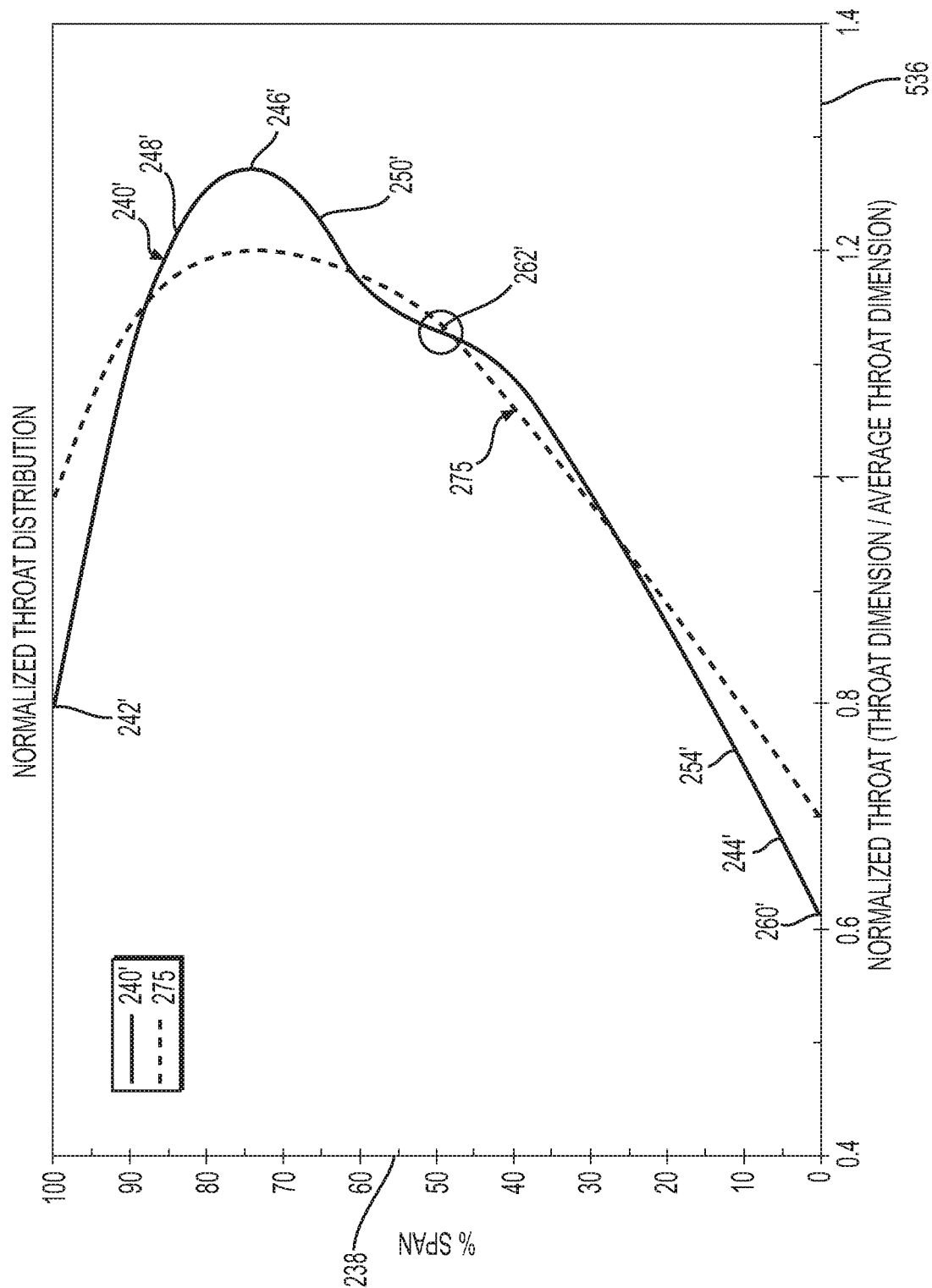
FIG. 5A is a graph of normalized throat (throat dimension divided by average throat dimension; abscissa) versus percent span (ordinate) illustrating a spanwise throat distribution associated with the rotor of FIG. 2.

In this example, with reference to FIG. 5A, a graph shows the variation of a throat dimension distribution 240' along the span S of the airfoils 204. In FIG. 5A, the abscissa or horizontal axis 236' is a normalized value of the throat dimension, which is normalized by dividing the throat dimension at the particular spanwise location by an average throat dimension between adjacent ones of the airfoils 204 along the entirety of the span of the airfoils 204 (and the normalized throat dimension may be multiplied by 100 to arrive at a percentage of the average value); and the ordinate or vertical axis 238 is the spanwise location or location along the span of the adjacent airfoils 204 (span is 0% at the root 210 (FIG. 3) and span is 100% at the tip 212 (FIG. 3)). In one example, the normalized value of the throat dimension ranges from about 0.6 to about 1.3. As used herein the "average throat dimension" is the average throat dimension between the airfoils 204 taken along the span S of the airfoils 204 from 0% at the root 210 (FIG. 3) to 100% at the tip 212 (FIG. 3).

As shown in FIG. 5A, the throat dimension between 90% of the span and 100% of the span of the adjacent ones of the plurality of airfoils 204 has a first value 242'. In one example, the first value 242' is about 0.7 (70%) to about 0.8 (80%) of the average throat dimension of the throat dimension distribution 240'. The first value 242' of the throat dimension distribution 240' is defined as the minimum physical distance between the two airfoils 204 at a spanwise location between 90% of the span and 100% of the span, and in this example, the first value 242' is at the tip 212 or 100% span.

The throat dimension between 0% of the span and 20% of the span of the adjacent ones of the plurality of airfoils 204 has a second value 244'. The second value 244' is less than the first value 242'. In one example, the second value 244' is about 0.6 (60%) to about 0.7 (70%) of the average throat dimension of the throat dimension distribution 240'. The second value 244' of the throat dimension distribution 240' is defined as the minimum physical distance between the two airfoils 204 at a spanwise location between 0% of the span and 20% of the span, and in this example, the second value 244' is at about 5% span and is less than 0.7 (70%) of the average throat dimension of the throat dimension distribution 240'. The throat dimension distribution 240' between adjacent ones of the airfoils 204 at 0% span (at the root 210 (FIG. 3)) is a seventh value 260' for the throat dimension, and the throat dimension changes from 0% span to the second value 244'. The seventh value 260' is less than the first value 242' and the second value 244', and is an absolute minimum value for the throat dimension distribution 240'.

With continued reference to FIG. 5A, the throat dimension has a maximum value 246' at a spanwise location between 60% of the span and 90% of the span of the adjacent ones of the plurality of airfoils 204. In one example, the maximum value 246' is located or defined at about 75% of the span. The maximum value 246' is the largest value for the throat dimension distribution 240', and the maximum value 246' is about 1.2 (120%) to about 1.3 (130%) of the average throat dimension of the throat dimension distribution 240'. The maximum value 246' of the throat dimension distribution 240' is defined as the minimum physical distance between the two airfoils 204 at a spanwise location between 60% of the span and 90% of the span, and in this example, the maximum value 246' is at about 75% span.

The throat dimension has a third value 248' at 10% of the span of the adjacent ones of the plurality of airfoils 204 above the spanwise location (toward the tip 212 or 100% span) of the maximum value 246'. The third value 248' of the throat dimension at 10% of the span of the adjacent ones of the plurality of airfoils 204 above the spanwise location of the maximum value 246' is less than 97% of the maximum value 246'. In the example of the maximum value 246' of about 1.25 (125%) of the average throat dimension of the throat dimension distribution 240', the third value 248' has a normalized throat value that is less than about 1.2. In the example of the maximum value 246' at 75% span, the third value 248' is at 85% span. The third value 248' of the throat dimension distribution 240' is defined as the minimum physical distance between the two airfoils 204 at a spanwise location at 10% span above the spanwise location of the maximum value 246', which in this example, is at about 85% span.

With continued reference to FIG. 5A, the throat dimension also has a fourth value 250' at 10% of the span of the adjacent ones of the airfoils 204 below the spanwise location (toward the root 210 or 0% span) of the maximum value 246'. The fourth value 250' of the throat dimension at 10% of the span of the adjacent ones of the airfoils 204 below the spanwise location of the maximum value 246' is less than 97% of the maximum value 246'. In the example of the maximum value 246' of about 1.25 (125%) of the average throat dimension of the throat dimension distribution 240', the fourth value 250' has a normalized throat value that is less than about 1.2. In the example of the maximum value 246' at 75% span, the fourth value 250' is at 65% span. The fourth value 250' of the throat dimension distribution 240' is defined as the minimum physical distance between the two airfoils 204 at a spanwise location at 10% span below the spanwise location of the maximum value 246', which in this example, is at about 65% span.

Thus, at 10% of the span of the adjacent ones of the airfoils 204 above or below the spanwise location of the maximum value 246', the throat dimension is less than 97% of the maximum value 246'. Stated another way, the value of the throat dimension at 10% of the span of the adjacent ones of the airfoils 204 above or below the spanwise location of the maximum value 246' is reduced by at least 3% of the maximum value 246'.

In addition, the throat dimension has a fifth value 254' at 10% of the span of the adjacent ones of the plurality of airfoils that is less than 60% of the maximum value 246' of the throat dimension distribution 240'. In the example of the maximum value 246' of about 1.25 (125%) of the average throat dimension of the throat dimension distribution 240', the fifth value 254' has a normalized throat value that is less than about 0.75.

With continued reference to FIG. 5A, the throat dimension between 40% of the span and 60% of the span of the adjacent ones of the plurality of airfoils 204 has a sixth value 262'. The sixth value 262' is less than the third value 248' and is less than the fourth value 250'. In one example, the sixth value 262' is about 1.0 to about 1.2 of the average throat dimension of the throat dimension distribution 240'. In this example, the sixth value 262' of the throat dimension distribution 240' is defined as the minimum physical distance between the two airfoils 204 at a spanwise location between 40% of the span and 60% of the span, and in this example the sixth value 262' is at a spanwise location that is about 25% less than the spanwise location of the maximum value 246. As shown in FIG. 5A, is at a spanwise location of about 50% span when the maximum value 246' is at a spanwise location of about 75% span.

With continued reference to FIG. 5A, by providing the throat dimension distribution 240' with the maximum value 246' of the throat dimension between 60% span and 90% span with the third value 248' and the fourth value 250' at 10% of the span of the adjacent ones of the airfoils 204 above or below the spanwise location of the maximum value 246' at less than 97% of the maximum value 246', the throat dimension distribution 240' provides increased flow capacity in contrast to a conventional throat dimension distribution 275. By providing the value of the throat dimension at 10% of the span of the adjacent ones of the airfoils 204 above or below the spanwise location of the maximum value that is less than 97% of the maximum value, the throat dimension distribution 240' of the present disclosure provides increased flow capacity while maintaining an efficiency and flutter margin of the rotor 200. In this regard, by providing the value of the throat dimension at 10% of the span of the adjacent ones of the airfoils 204 above or below the spanwise location of the maximum value that is less than 97% of the maximum value, the throat dimension is reduced at the tip but increased between 60% and 90% of the span of the adjacent ones of the airfoils 204, which reduces flutter risk while increasing flow capacity.

With the airfoils 204 formed, the airfoils 204 are coupled to the rotor hub 222 to form the rotor 200. As discussed, each of the airfoils 204 are spaced apart about the circumference of the rotor disk 202 by the throat dimension distribution 240. With reference to FIG. 5, the throat dimension distribution 240 between adjacent ones of the airfoils 204 at 0% span (at the root 210 (FIG. 3)) is a seventh value 260 for the throat dimension, and the throat dimension changes from 0% span to the second value 244. The seventh value 260 is less than the first value 242 and the second value 244. The seventh value 260 is an absolute minimum value for the throat dimension in the throat dimension distribution 240. The second value 244 is at a spanwise location between 0% and 10% of the span. From the second value 244, the throat dimension changes to the sixth value 262, which is less than the fourth value 250. From the sixth value 262, the throat dimension changes to the fourth value 250, which is less than 97% of the maximum value 246 and is located at a spanwise location that is 10% less than a spanwise location of the maximum value 246. From the fourth value 250, the throat dimension changes to the maximum value 246. The maximum value 246 is at a spanwise location between 60% and 90% of the span of the airfoils 204. From the maximum value 246, the throat dimension changes to the third value 248, which is less than 97% of the maximum value 246 and is located at a spanwise location that is 10% above a spanwise location of the maximum value 246. From the third value 248, the throat dimension changes to the first value 242, which is at a spanwise location between 90% and 100% of the span. The first value 242 and the second value 244 are each less than 70% of the maximum value 246, and the second value 244 is less than 60% of the maximum value 246 and is less than the first value 242. The first value 242 is greater than 60% of the maximum value 246.

Generally, in this example, the throat dimension distribution 240 increases from 0% span to the second value 244, and increases to the sixth value 262. The throat dimension distribution 240 also generally increases from the sixth value 262 to the fourth value 250. From the fourth value 250, the throat dimension distribution 240 generally increases to the maximum value 246 and decreases to the third value 248. From the third value 248, the throat dimension distribution 240 decreases to the first value 242. It should be noted that the increases and decreases in the throat dimension distribution 240 may not be monotonic as shown in FIG. 5. Rather, one or more of the changes in throat dimension distribution 240 may include a local increase or a local decrease before the throat dimension distribution 240 changes between the various values 244, 262, 250, 246, 248, 242.

With the rotor 200 formed, the rotor 200 is installed in the gas turbine engine 100 (FIG. 1). In general, the rotor 200 may be incorporated into one or more of the engine sections described with regard to FIG. 1 above. For example and additionally referring to FIG. 1, the rotor 200 may be incorporated into the fan section 102 such that, as the rotor 200 rotates, the airfoils 204 function to draw air into the gas turbine engine 100. Further, the rotor 200 may be incorporated into one or more of the high pressure compressor 122 and/or the intermediate pressure compressor 120 such that, as the rotor 200 rotates, the airfoils 204 function to compress the air flowing through the airfoils 204.

Rotor Blade Camber Distribution

Figure 11:
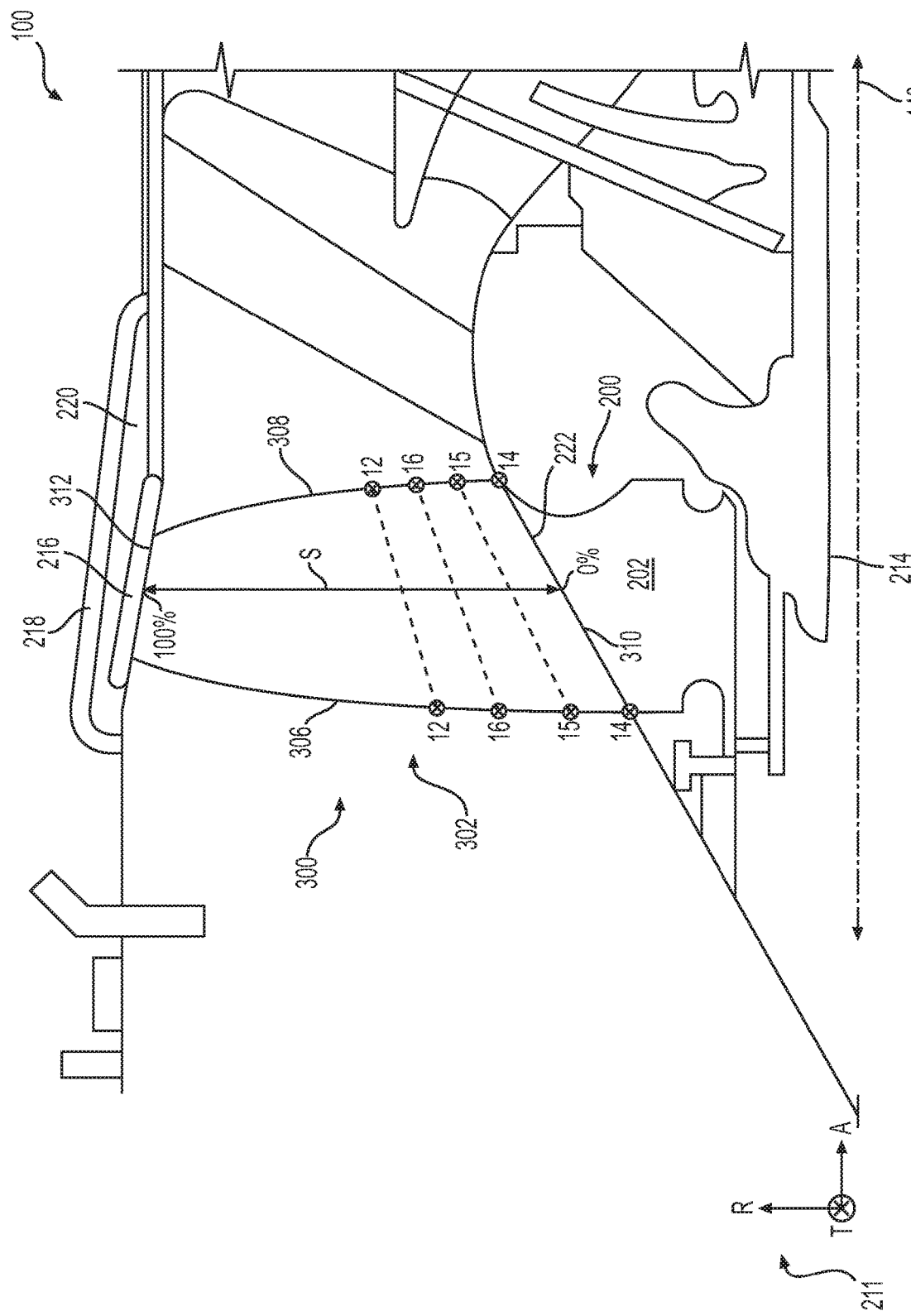
FIG. 11 is a schematic cross-sectional view of the rotor of FIG. 2, taken along line 2-2 of FIG. 2, which illustrates another exemplary one of the rotor blades associated with the rotor of FIG. 2 that has a total camber distribution that reduces flutter.

As discussed previously, with reference back to FIG. 2, the rotor 200 may include the plurality of rotor blades 300, which have a total camber distribution 302 that reduces flutter. In the example of the rotor 200, each of the rotor blades 300 may be referred to as an "airfoil 300." The airfoils 300 extend in a radial direction (relative to the longitudinal axis 140 of the gas turbine engine 100) about the periphery of the rotor disk 202, and may be spaced apart by the throat dimension distribution 240. With reference to FIG. 11, one of the airfoils 300 for use with the rotor 200 of the gas turbine engine 100 is shown. The airfoils 300 each include a leading edge 306, an axially-opposed trailing edge 308, a base or root 310, and a radially-opposed tip 312. The tip 312 is spaced from the root 310 in a blade height, span or spanwise direction, which generally corresponds to the radial axis (R-axis) of the coordinate legend 211 in the view of FIG. 11. As shown in FIG. 11, the span S of each of the airfoils 300 is 0% at the root 310 (where the airfoil 300 is coupled to the rotor hub 222) and is 100% at the tip 312. In this example, the airfoils 300 are arranged in a ring or annular array surrounded by the static fan shroud 216. The static fan shroud 216 is, in turn, circumscribed by the annular housing piece 218 defining the containment pocket 220. The airfoils 300 and the rotor disk 202 are generally composed of a metal, metal alloy or a polymer-based material, such as a polymer-based composite material. In one example, the airfoils 300 are integrally formed with the rotor disk 202 as a monolithic or single piece structure commonly referred to as a bladed disk or "blisk." In other examples, the airfoils 300 may be insert-type blades, which are received in mating slots provided around the outer periphery of rotor disk 202. In still further examples, the rotor 200 may have a different construction. Generally, then, it should be understood that the rotor 200 is provided by way of non-limiting example and that the rotor 200 (and the airfoils 300 described herein) may be fabricated utilizing various different manufacturing approaches. Such approaches may include, but are not limited to, casting and machining, three dimensional metal printing processes, direct metal laser sintering, Computer Numerical Control (CNC) milling of a preform or blank, investment casting, electron beam melting, binder jet printing and powder metallurgy, ply lay-up, to list but a few examples. Regardless of its construction, the rotor 200 includes the rotor hub 222 defining a hub flow path. The hub flow path extends over the outer surface of the rotor 200 and between the airfoils 300 to guide airflow along from the inlet end (inducer or leading edge) to the outlet end (exducer or trailing edge) of the rotor 200. As shown in FIG. 11, each of the plurality of airfoils 300 is coupled to the rotor hub 222 at the root 310 (0% span). It should be noted that while each of the plurality of airfoils 300 are illustrated herein as being coupled to the rotor hub 222 at an angle relative to the axial direction (A-axis), one or more of the plurality of airfoils 300 may be coupled to the rotor hub 222 along a straight line. Further, it should be noted that one or more of the plurality of airfoils 300 may be coupled to the rotor hub 222 along a complex curved surface. It should be noted that in the instances where the plurality of airfoils 300 are coupled to the rotor hub 222 at an angle, the span remains at 0% at the root 310. In other words, the span of each of the plurality of airfoils 300 remains at 0% at the root 310 regardless of the shape of the rotor hub 222.

Figure 12:
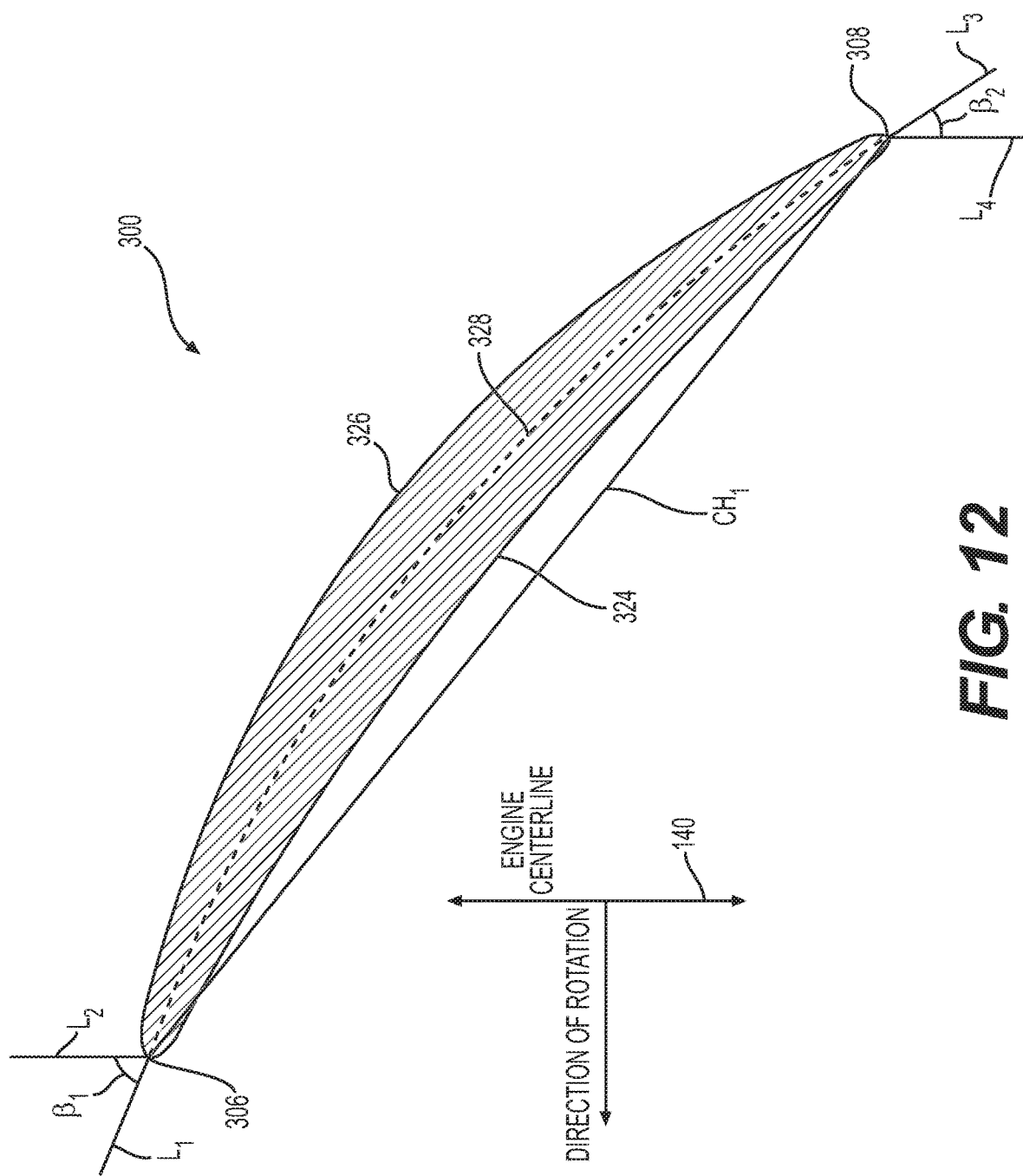
FIG. 12 is a cross-sectional view of the rotor blade of FIG. 11, taken along line 12-12 of FIG. 11.

With reference to FIG. 12, each of the airfoils 300 further includes a first principal face or a "pressure side" 324 and a second, opposing face or a "suction side" 326. The pressure side 324 and the suction side 326 extend in a chordwise direction along a chord line $CH_1$ and are opposed in a thickness direction normal to a mean camber line 328, which is illustrated as a dashed line in FIG. 12 that extends from the leading edge 306 to the trailing edge 308. The pressure side 324 and the suction side 326 extend from the leading edge 306 to the trailing edge 308. In one example, each of the airfoils 300 is somewhat asymmetrical and has a total camber $\theta_T$ along the mean camber line 328. The pressure side 324 has a contoured, generally concave surface geometry, which gently bends or curves in three dimensions. The suction side 326 has a contoured, generally convex surface geometry, which likewise bends or curves in three dimensions.

In one example, each of the airfoils 300 has an inlet metal angle β1 defined at the leading edge 306. The inlet metal angle β1 is the angle between a reference line L1 that is tangent to the mean camber line 328 at the leading edge 306 and a reference line L2 that is parallel to the engine center line or the longitudinal axis 140 of the gas turbine engine 100 (FIG. 2) and normal to the direction of rotation DR. Each of the airfoils 300 also have an exit metal angle β2 defined at the trailing edge 308. The exit metal angle β2 is the angle between a reference line L3 that is tangent to the mean camber line 328 at the trailing edge 308 and a reference line L4 that is parallel to the engine center line or the longitudinal axis 140 of the gas turbine engine 100 (FIG. 2) and normal to the direction of rotation DR. Generally, at a particular span of the airfoil 300, the airfoils 300 have the inlet metal angle β1 and the exit metal angle β2. The inlet metal angle β1 and the exit metal angle β2 for the airfoil 300 may vary over the span S of the airfoil 300 based on the total camber distribution 302 of the airfoil 300 (FIG. 11). As used herein, a total camber $\theta_T$ of the airfoil 300 at a particular span is defined by the following equation:

$$\theta_T = \beta_1 - \beta_2 \quad (1)$$

Wherein, $\theta_T$ is the total camber of the airfoil 300 at the particular span; β1 is the inlet metal angle in degrees; and β2 is the exit metal angle in degrees. Thus, as used herein, the "total camber" of the mean camber line 328 of the airfoil 300 at a particular span is a difference between an inlet metal angle (β1) and an exit metal angle (β2) at the particular spanwise location. As will be discussed, the total camber distribution 302 of each of the airfoils 300 varies over the span S (FIG. 11) of the airfoil 300 to reduce flutter. In this regard, as will be discussed, the total camber distribution 302 of each of the airfoils 300 has a reduced total camber $\theta_T$ at the root 310, which reduces the twist-to-flex ratio of the fundamental vibratory mode shape associated with each of the airfoils 300. By reducing the twist-to-flex ratio of the fundamental vibratory mode shape through the change in the mode shape of each of the airfoils 300 that is obtained by providing a reduced total camber $\theta_T$ at or near the root 310, each of the airfoils 300 is less susceptible to flutter. For any section of an airfoil, the twist-to-flex ratio is the amount of torsional rotation of the section relative to the amount of translational displacement of the section from the mode of vibration.

Figure 13:
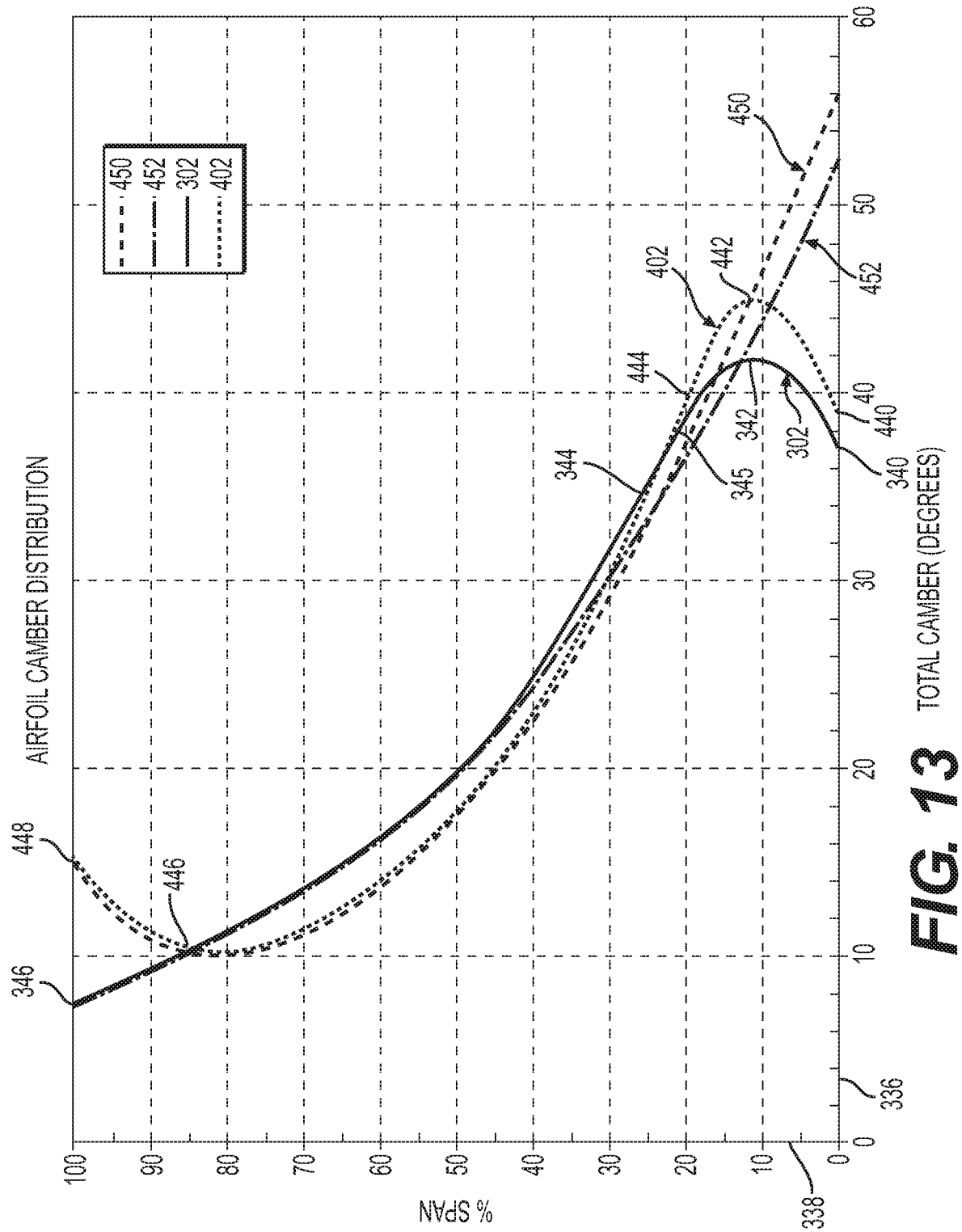
FIG. 13 is a graph of total camber (in degrees; abscissa) versus percent span (ordinate) illustrating two exemplary spanwise total camber distributions associated with the rotor blade of FIG. 11.

In one example, with reference to FIG. 13, a graph shows the variation of the total camber distribution 302 along the span S of each of the airfoils 300. In FIG. 13, the abscissa or horizontal axis 336 is the total camber $\theta_T$ in degrees; and the ordinate or vertical axis 338 is the spanwise location or location along the span S of each of the airfoils 300 (span is 0% at the root 310 (FIG. 11) and span is 100% at the tip 312 (FIG. 11)).

Figure 14:
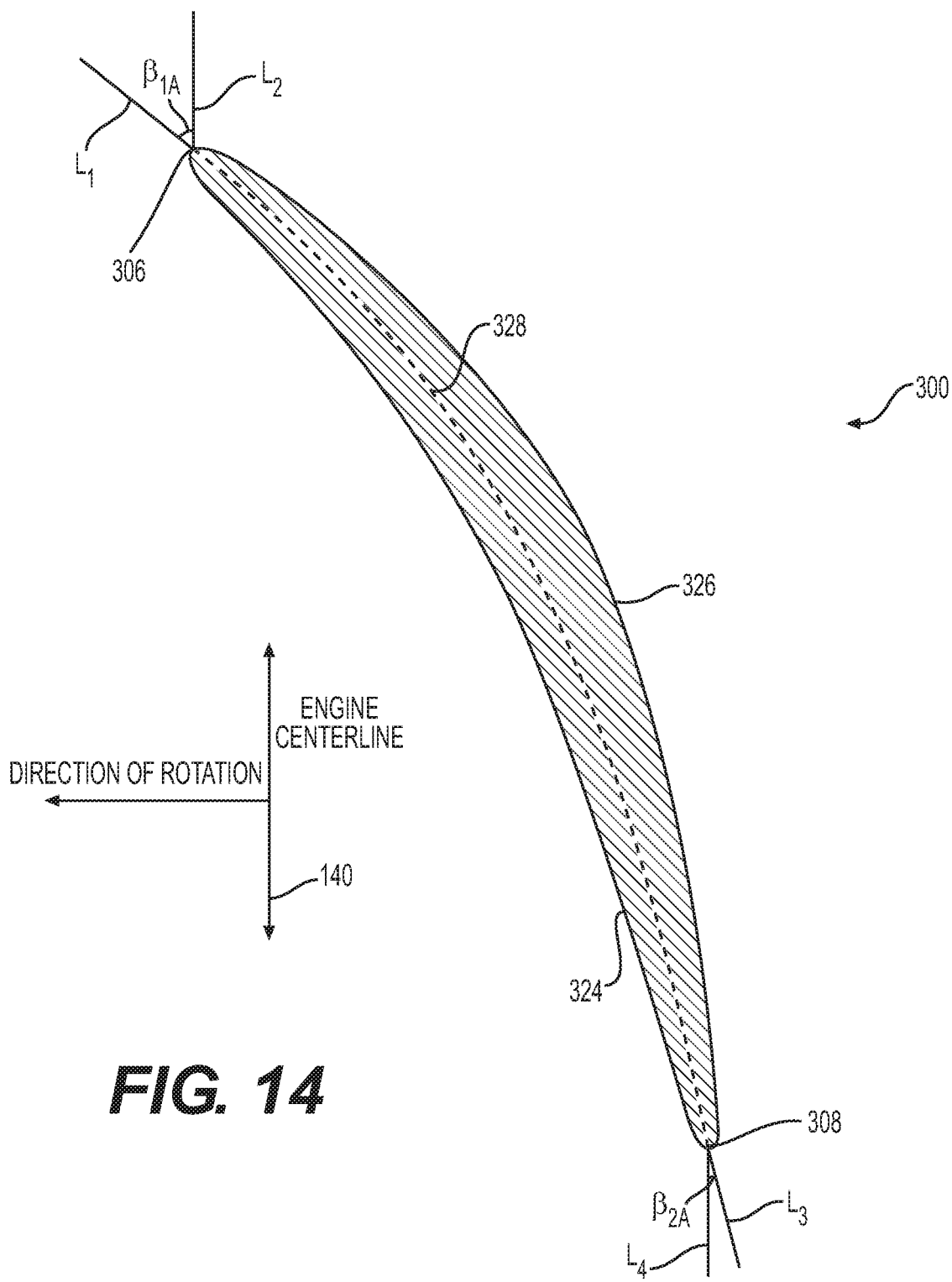
FIG. 14 is a cross-sectional view of the rotor blade of FIG. 11, taken along line 14-14 of FIG. 11, which illustrates a total camber of the rotor blade at a spanwise location between 0% of the span and 5% of the span.

As shown in FIG. 13, the total camber $\theta_T$ between 0% of the span and 5% of the span of each of the airfoils 300 has a first value 340. In one example, the first value 340 of the total camber $\theta_T$ is about 34 degrees to about 40 degrees, and in this example, is about 37 degrees. With reference to FIG. 14, the first value 340 of the total camber $\theta_T$ for each of the airfoils 300 is shown. FIG. 14 is a cross-sectional view through one of the airfoils 300, taken from line 14-14 of FIG. 11 into the page. As shown in FIG. 14, the first value 340 of the total camber $\theta_T$ is defined as the difference between an inlet metal angle β1A and an exit metal angle β2A at a spanwise location between 0% of the span and 5% of the span, which in the example of FIG. 13 is at 0% span or at the root 310. Thus, the first value 340 of the total camber $\theta_T$ at or near the root 310 (between 0% span and 5% span of each of the airfoils 300) is less than the maximum total camber value 342 of the total camber distribution 302 of each of the airfoils 300. Stated another way, each of the airfoils 300 has a locally reduced total camber $\theta_T$ at or near the root 310, which reduces the twist-to-flex ratio of the fundamental vibratory mode shape associated with each of the airfoils 300.

Figure 15:
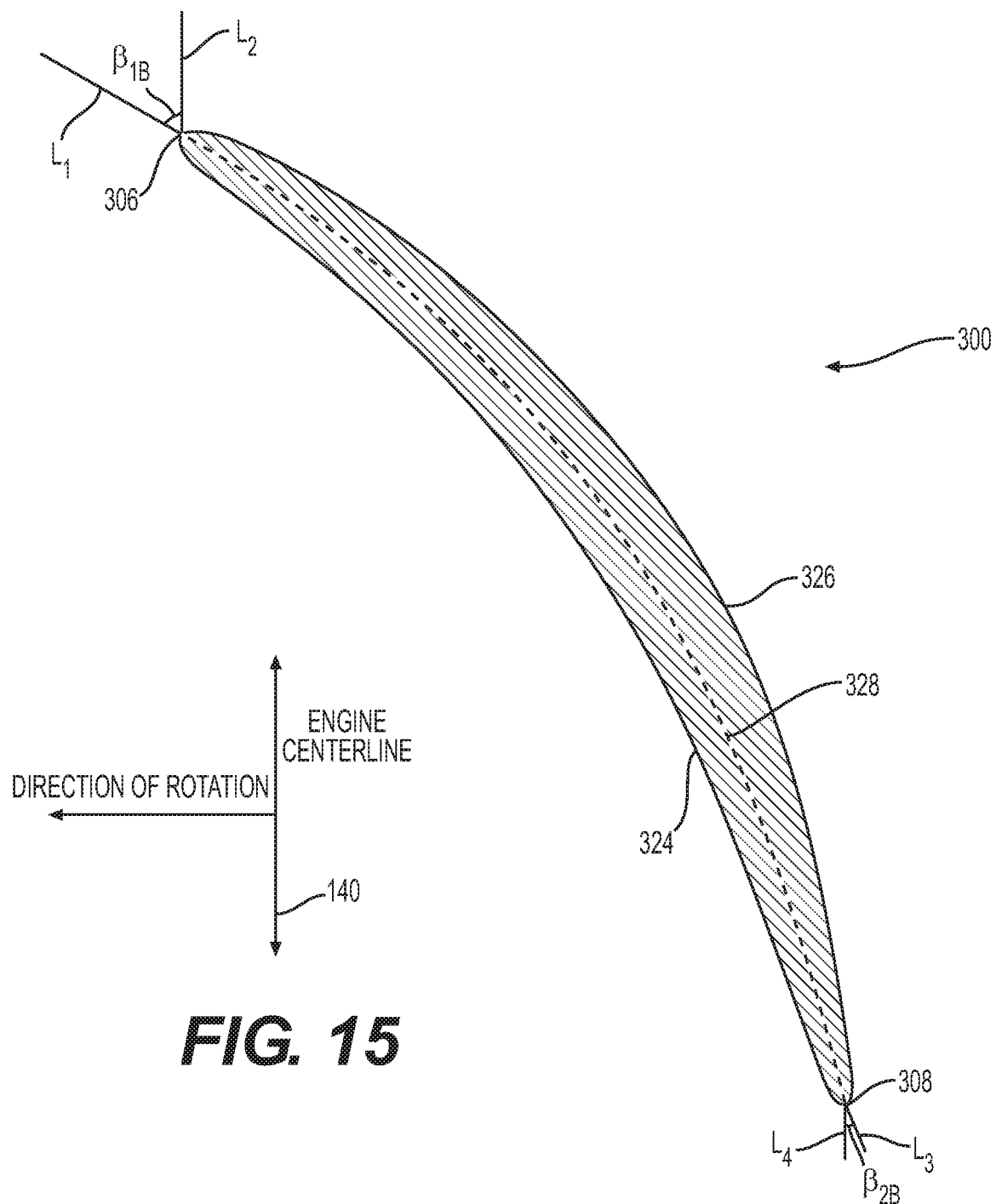
FIG. 15 is a cross-sectional view of the rotor blade of FIG. 11, taken along line 15-15 of FIG. 11, which illustrates a total camber of the rotor blade at a spanwise location between 5% of the span and 20% of the span.

With reference back to FIG. 13, the total camber $\theta_T$ between 5% of the span and 20% of the span of each of the airfoils 300 has a maximum value of total camber $\theta_T$ or maximum total camber value 342. In one example, the maximum total camber value 342 of the total camber $\theta_T$ is about 40 degrees to about 45 degrees, and in this example, is about 42 degrees. With reference to FIG. 15, the maximum total camber value 342 of the total camber $\theta_T$ for each of the airfoils 300 is shown. FIG. 15 is a cross-sectional view through one of the airfoils 300, taken from line 15-15 of FIG. 11 into the page. As shown in FIG. 15, the maximum total camber value 342 of the total camber $\theta_T$ is defined as the difference between an inlet metal angle β1B and an exit metal angle β2B at a spanwise location between 5% of the span and 20% of the span, which in the example of FIG. 15 is at 12% span. The maximum total camber value 342 is greater than the first value 340. Thus, in this example, the total camber $\theta_T$ of each of the airfoils 300 increases from the root 310 (FIG. 11) to the maximum total camber value 342.

With reference back to FIG. 13, the total camber $\theta_T$ between 20% of the span and 30% of the span of each of the airfoils 300 has a second value 344. In one example, the second value 344 of the total camber $\theta_T$ is about 32 degrees to about 38 degrees, and in this example, is about 35 degrees.

Figure 16:
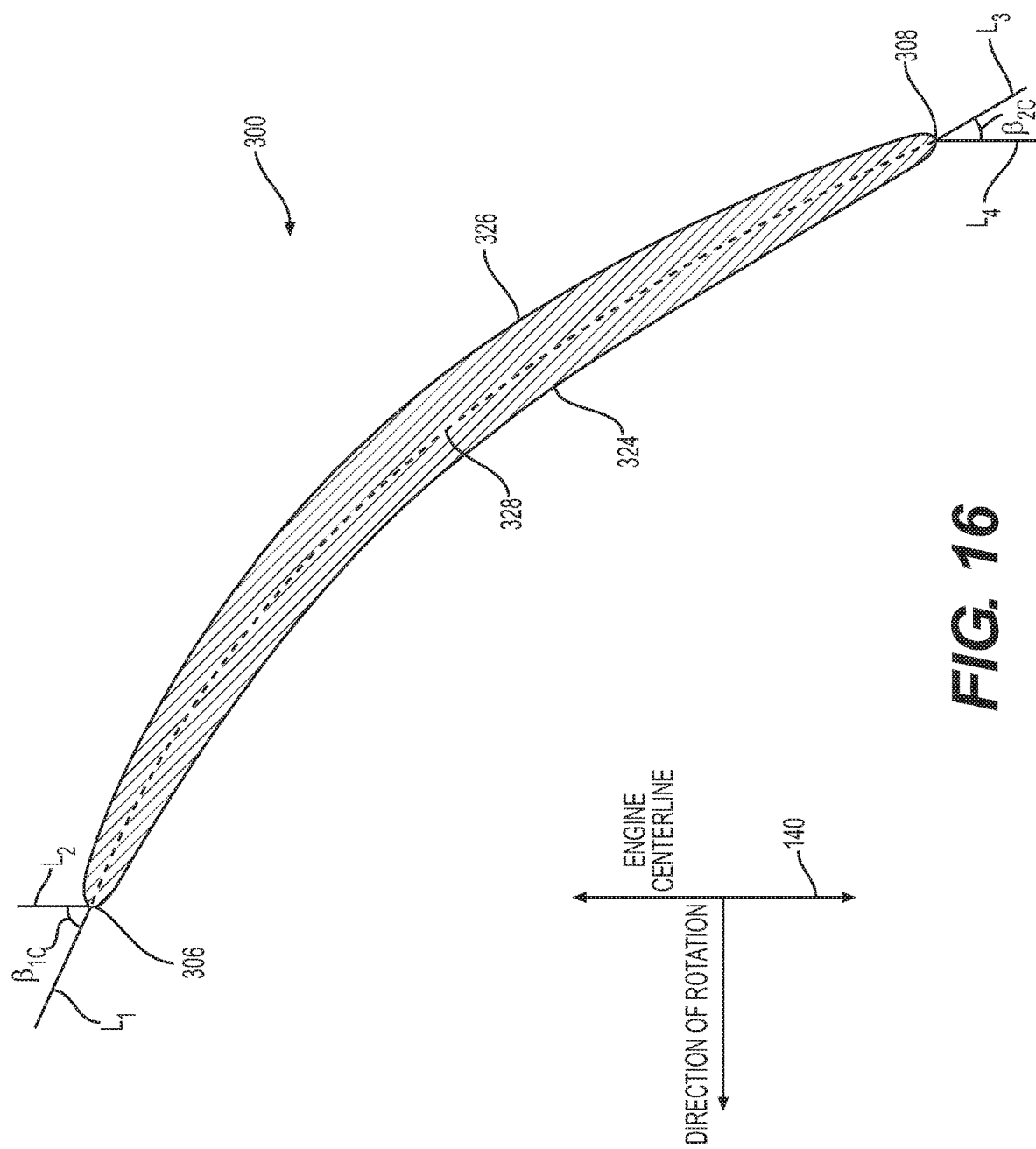
FIG. 16 is a cross-sectional view of the rotor blade of FIG. 11, taken along line 16-16 of FIG. 11, which illustrates a total camber of the rotor blade at a spanwise location between 20% of the span and 30% of the span.

With reference to FIG. 16, the second value 344 of the total camber $\theta_T$ for each of the airfoils 300 is shown. FIG. 16 is a cross-sectional view through one of the airfoils 300, taken from line 16-16 of FIG. 11 into the page. As shown in FIG. 16, the second value 344 of the total camber $\theta_T$ is defined as the difference between an inlet metal angle β1C and an exit metal angle β2C at a spanwise location between 20% of the span and 30% of the span, which in the example of FIG. 16 is at 25% span. The second value 344 is less than the maximum total camber value 342 and the second value 344 is less than the first value 340. With reference back to FIG. 13, the total camber between 20% of the span and 30% of the span of each of the airfoils 300 has a fourth value 345. In one example, the fourth value 345 of the total camber $\theta_T$ is about 35 degrees to about 40 degrees, and in this example, is about 39 degrees. The fourth value 345 of the total camber $\theta_T$ is defined as the difference between an inlet metal angle β1C and an exit metal angle β2C at a spanwise location between 20% of the span and 30% of the span, which in this example is at 20% span. Thus, in this example, the total camber $\theta_T$ of each of the airfoils 300 decreases from the maximum total camber value 342 (FIG. 11) to the second value 344.

Figure 17:
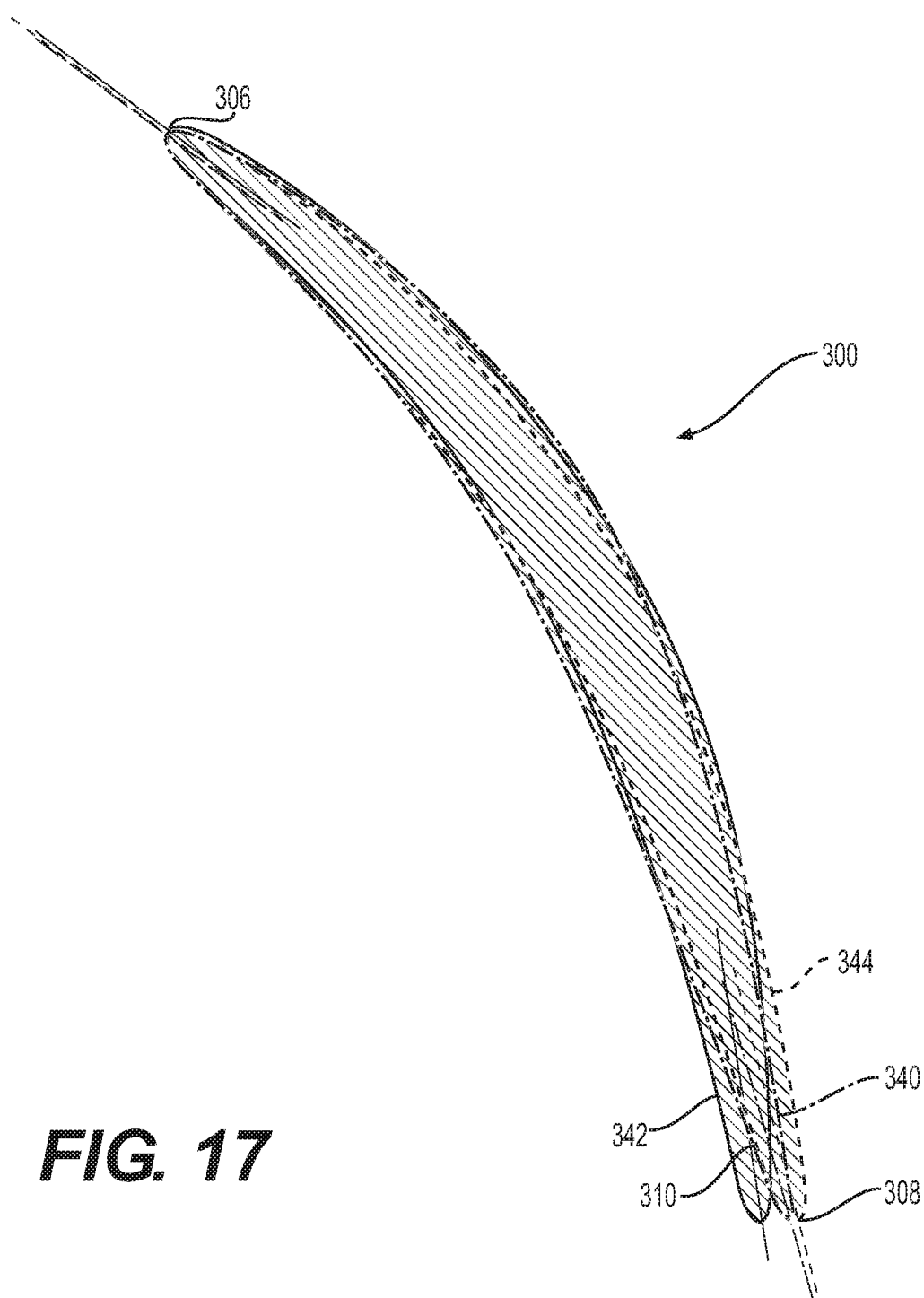
FIG. 17 is an overlay of the cross-sectional views of FIGS. 14-16, which illustrates a portion of the total camber distribution of the rotor blade.

With reference to FIG. 17, a portion of the total camber distribution 302 of one of the airfoils 300 is shown. FIG. 17 is an overlay of the cross-sectional views of FIGS. 14-16 of the one of the airfoils 300. As shown in FIG. 17, the total camber $\theta_T$ of each of the airfoils 300 increases from the root 310 to the maximum total camber value 342, and decreases from the maximum total camber value 342 to the second value 344. In this example, with reference to FIG. 13, the total camber $\theta_T$ decreases monotonically from the second value 344 to the tip 312 (FIG. 11) or decreases monotonically to a third value 346 at 100% of the span. The third value 346 is less than 20 degrees, and in one example, the third value 346 of the total camber $\theta_T$ is about 3 degrees to about 10 degrees, and in this example, is about 8 degrees.

Generally, in this example, the total camber $\theta_T$ of each of the airfoils 300 increases from 0% span to the maximum total camber value 342, decreases from the maximum total camber value 342 to the second value 344 and decreases from the second value 344 to the third value 346 at 100% of the span. It should be noted that the increases and decreases in the total camber $\theta_T$ of one or more of the airfoils 300 may not be monotonic as shown in FIG. 13. Rather, one or more of the changes in total camber $\theta_T$ may include a local increase or a local decrease before the total camber $\theta_T$ changes between the various values 342, 344, 346.

It will be understood that the total camber distribution 302 of the airfoils 300 described with regard to FIGS. 11-17 may be configured differently to reduce flutter. In one example, with reference back to FIG. 13, the graph also shows an exemplary total camber distribution 402 along the span S of each of the airfoils 300. In this example, the total camber $\theta_T$ between 0% of the span and 5% of the span of each of the airfoils 300 has a first value 440. In one example, the first value 440 of the total camber $\theta_T$ is about 35 degrees to about 40 degrees, and in this example, is about 39 degrees at 0% span. The total camber $\theta_T$ of the total camber distribution 402 between 5% of the span and 20% of the span of each of the airfoils 300 has a maximum value of total camber or maximum total camber value 442. In one example, the maximum total camber value 442 of the total camber $\theta_T$ is about 42 degrees to about 48 degrees, and in this example, is about 45 degrees at 12% span. The maximum total camber value 442 is greater than the first value 440. Thus, for the total camber distribution 402, the total camber $\theta_T$ of each of the airfoils 300 increases from the root 310 (FIG. 11) to the maximum total camber value 442.

For the total camber distribution 402, the total camber $\theta_T$ between 20% of the span and 30% of the span of each of the airfoils 300 has a second value 444. In one example, the second value 444 of the total camber $\theta_T$ is about 38 degrees to about 42 degrees, and in this example, is about 40 degrees at 20% span. The second value 444 is less than the maximum total camber value 442 and the second value 444 is less than the first value 440. Thus, for the total camber distribution 402, the total camber $\theta_T$ of each of the airfoils 300 decreases from the maximum total camber value 442 to the second value 444.

For the total camber distribution 402, the total camber $\theta_T$ decreases from the second value 444 to a third value 446 between 80% of the span and 90% of the span of each of the airfoils 300. In one example, the third value 446 of the total camber $\theta_T$ is about 8 degrees to about 12 degrees, and in this example, is about 10 degrees at 85% span. The third value 446 is less than the maximum total camber value 442, the second value 444 and the first value 440. In addition, for the total camber distribution 402, the total camber $\theta_T$ increases from the third value 446 to a fourth value 448 between 90% of the span and 100% of the span of each of the airfoils 300. In one example, the fourth value 448 of the total camber $\theta_T$ is about 14 degrees to about 19 degrees, and in this example, is about 15 degrees at 100% span. The fourth value 448 is greater than the third value 446, but the fourth value 448 is less than the maximum total camber value 442, the second value 444 and the first value 440. The fourth value 448 of the total camber $\theta_T$ is less than 20 degrees. Thus, for the total camber distribution 402, the total camber $\theta_T$ of each of the airfoils 300 decreases from the maximum total camber value 442 to the third value 446 between 80% and 90% span, and increases from the third value 446 to the tip 312 (FIG. 11) or 100% span. Thus, the total camber distribution 402 has a local increase near the tip 312 of each of the airfoils 300.

Generally, in the example of the total camber distribution 402, the total camber $\theta_T$ of each of the airfoils 300 increases from 0% span to the maximum total camber value 442, decreases from the maximum total camber value 442 to the second value 444, decreases from the second value 444 to the third value 446 and increases from the third value 446 to the fourth value 448 at 100% of the span. It should be noted that the increases and decreases in the total camber $\theta_T$ of the total camber distribution 402 of one or more of the airfoils 300 may not be as shown in FIG. 13. Rather, one or more of the changes in total camber $\theta_T$ may include a local increase or a local decrease before the total camber $\theta_T$ changes between the various values 444, 446, 448.

With continued reference to FIG. 13, by providing the total camber distributions 302, 402 with the maximum total camber value 342, 442 between 5% span and 20% span in contrast to conventional total camber distributions 450, 452, the total camber distributions 302, 402 reduce the twist-to-flex ratio of the fundamental vibratory mode shape associated with each of the airfoils 300. By providing the maximum total camber value 342, 442 at a spanwise location away from the root 310 or 0% span, the total camber distributions 302, 402 of the present disclosure each reduce flutter associated with the airfoil 300 by decreasing the total camber $\theta_T$ of the rotor blade 300 near and at the root 310 or 0% span of the rotor blade 300, which changes the twist-to-flex ratio of each of the rotor blades 300.

With each of the airfoils 300 formed with the total camber distribution 302 or the total camber distribution 402, the airfoils 300 are coupled to the rotor hub 222 to form the rotor 200. With the rotor 200 formed, the rotor 200 is installed in the gas turbine engine 100 (FIG. 1). In general, the rotor 200 may be incorporated into one or more of the engine sections described with regard to FIG. 1 above. For example and additionally referring to FIG. 1, the rotor 200 may be incorporated into the fan section 102 such that, as the rotor 200 rotates, the airfoils 300 function to draw air into the gas turbine engine 100 with reduced susceptibility to flutter. Further, the rotor 200 may be incorporated into one or more of the high pressure compressor 122 and/or the intermediate pressure compressor 120 such that, as the rotor 200 rotates, the airfoils 300 function to compress the air flowing through the airfoils 300 with reduced susceptibility to flutter.

Figure 18:
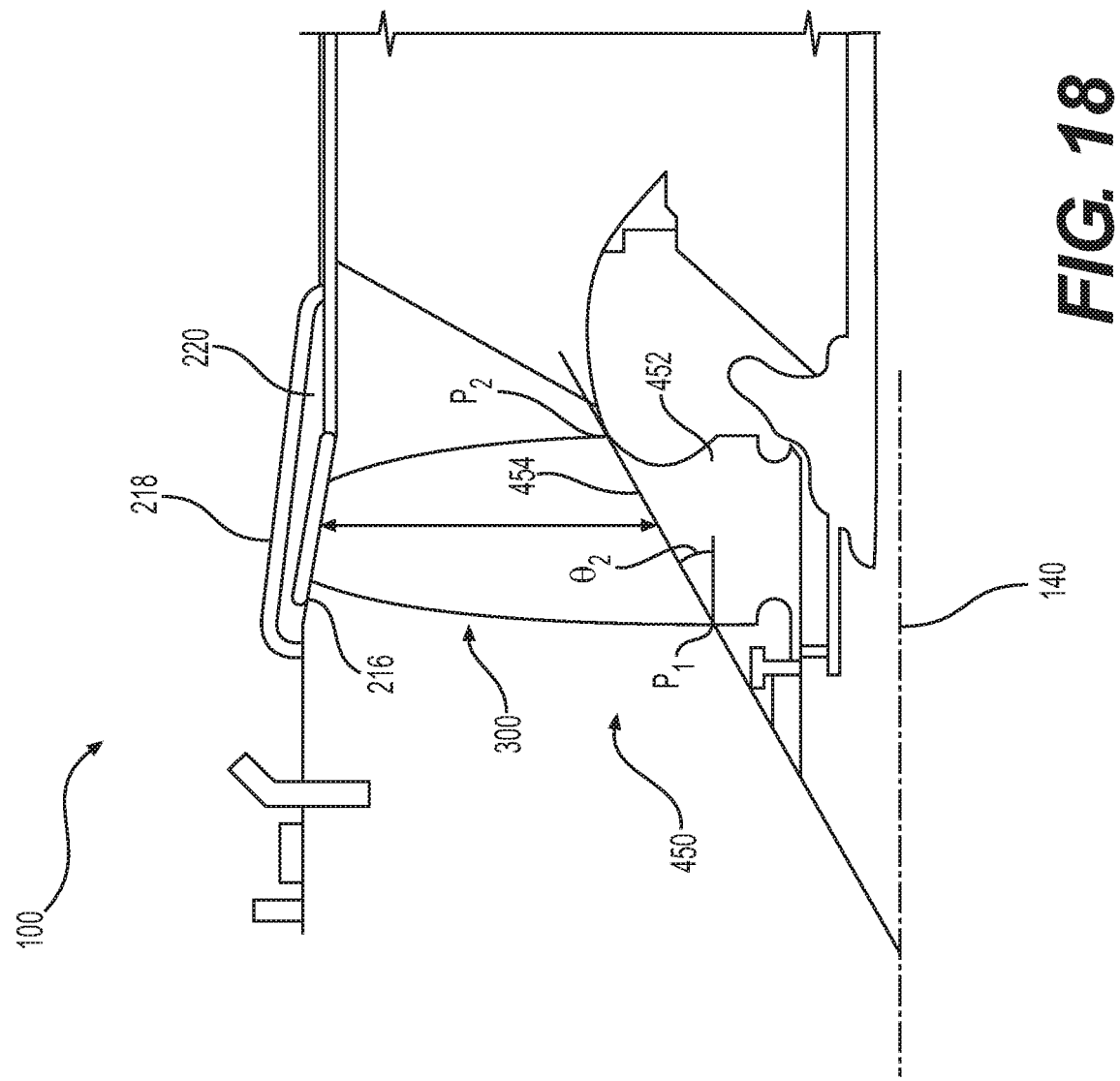
FIG. 18 is a schematic cross-sectional illustration of a portion of the gas turbine engine of FIG. 1, which includes a rotor having a hub slope angle and a plurality of rotor blades with a total camber distribution that reduces flutter.

It will be understood that the total camber distribution 302, 402 of the airfoils 300 described with regard to FIGS. 11-17 may be configured differently to reduce flutter. In one example, with reference to FIG. 18, a rotor 450 is shown for use with the gas turbine engine 100. The rotor 450 includes a rotor disk 452 from which the plurality of airfoils 300 extends. In one embodiment, the airfoils 300 are integrally formed with the rotor disk 452 as a monolithic or single piece structure commonly referred to as a bladed disk or "blisk." In other embodiments, the airfoils 300 may be insert-type blades, which are received in mating slots provided around the outer periphery of rotor disk 452. Regardless of its construction, the rotor 450 includes a rotor hub 454 defining a hub flow path. The hub flow path extends over the outer surface of the rotor 450 and between the airfoils 300 to guide airflow along from the inlet end (inducer or leading edge) to the outlet end (exducer or trailing edge) of the rotor 450. In this example, the rotor hub 454 extends at a hub angle $\theta 2$, which is formed between the longitudinal axis 140 of the gas turbine engine 100 and line extending from reference point P1 to reference point P2. In this example, the hub angle $\theta 2$ defines a hub slope angle for the rotor disk 452 and is greater than 20 degrees. Typically, a hub angle for a rotor is less than about 20 degrees. In certain instances, it is desirable to have a high rotor hub pressure rise, which is enabled by this higher value for the hub angle $\theta 2$, but this higher value may impact mode shape. By integrally forming the airfoils 300 having the total camber distribution 302, 402 with the rotor 450 having the hub slope angle or hub angle $\theta 2$, the rotor 450 having the increased hub slope angle (hub angle $\theta 2$ greater than about 20 degrees) provides for high hub pressure rise with reduced likelihood of flutter.

Rotor Blade Location of Local Maximum Thickness Distribution

Figure 19:
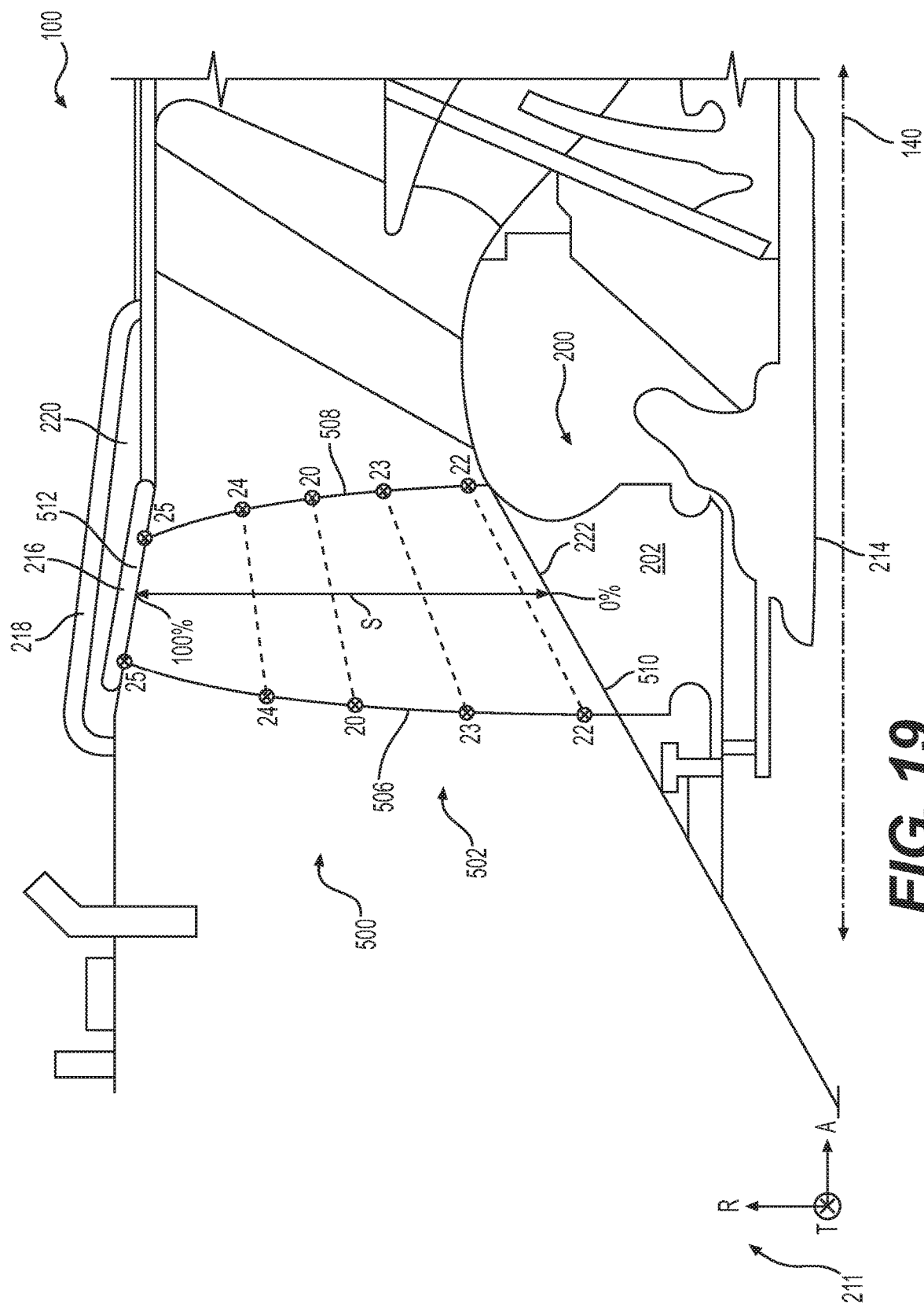
FIG. 19 is a schematic cross-sectional view of the rotor of FIG. 2, taken along line 2-2 of FIG. 2, which illustrates another exemplary one of the rotor blades associated with the rotor of FIG. 2 that has a location of local maximum thickness distribution that provides robustness to foreign object encounters.

As discussed previously, with reference back to FIG. 2, the rotor 200 may include the plurality of rotor blades 500, which have a location of local maximum thickness distribution 502 that provides robustness to foreign objects without increasing a weight of the rotor blade 500. In the example of the rotor 200, each of the rotor blades 500 may be referred to as an "airfoil 500." The airfoils 500 extend in a radial direction (relative to the longitudinal axis 140 of the gas turbine engine 100) about the periphery of the rotor disk 202, and may be spaced apart by the throat dimension distribution 240. With reference to FIG. 19, one of the airfoils 500 for use with the rotor 200 of the gas turbine engine 100 is shown. The airfoils 500 each include a leading edge 506, an axially-opposed trailing edge 508, a base or root 510, and a radially-opposed tip 512. The tip 512 is spaced from the root 510 in a blade height, span or spanwise direction, which generally corresponds to the radial axis (R-axis) of the coordinate legend 211 in the view of FIG. 19. As shown in FIG. 19, the span S of each of the airfoils 500 is 0% at the root 510 (where the airfoil 500 is coupled to the rotor hub 222) and is 100% at the tip 512. In this example, the airfoils 500 are arranged in a ring or annular array surrounded by the static fan shroud 216. The static fan shroud 216 is, in turn, circumscribed by the annular housing piece 218 defining the containment pocket 220. The airfoils 500 and the rotor disk 202 are generally composed of a metal, metal alloy or a polymer-based material, such as a polymer-based composite material. In one example, the airfoils 500 are integrally formed with the rotor disk 202 as a monolithic or single piece structure commonly referred to as a bladed disk or "blisk." In other examples, the airfoils 500 may be insert-type blades, which are received in mating slots provided around the outer periphery of rotor disk 202. In still further examples, the rotor 200 may have a different construction. Generally, then, it should be understood that the rotor 200 is provided by way of non-limiting example and that the rotor 200 (and the airfoils 500 described herein) may be fabricated utilizing various different manufacturing approaches. Such approaches may include, but are not limited to, casting and machining, three dimensional metal printing processes, direct metal laser sintering, Computer Numerical Control (CNC) milling of a preform or blank, investment casting, electron beam melting, binder jet printing, powder metallurgy and ply lay-up, to list but a few examples. Regardless of its construction, the rotor 200 includes the rotor hub 222 defining a hub flow path. The hub flow path extends over the outer surface of the rotor 200 and between the airfoils 500 to guide airflow along from the inlet end (inducer or leading edge) to the outlet end (exducer or trailing edge) of the rotor 200. As shown in FIG. 19, each of the plurality of airfoils 500 is coupled to the rotor hub 222 at the root 510 (0% span). It should be noted that while each of the plurality of airfoils 500 are illustrated herein as being coupled to the rotor hub 222 at an angle relative to the axial direction (A-axis), one or more of the plurality of airfoils 500 may be coupled to the rotor hub 222 along a straight line. Further, it should be noted that one or more of the plurality of airfoils 500 may be coupled to the rotor hub 222 along a complex curved surface. It should be noted that in the instances where the plurality of airfoils 500 are coupled to the rotor hub 222 at an angle, the span remains at 0% at the root 510. In other words, the span of each of the plurality of airfoils 500 remains at 0% at the root 510 regardless of the shape of the rotor hub 222.

Figure 20:
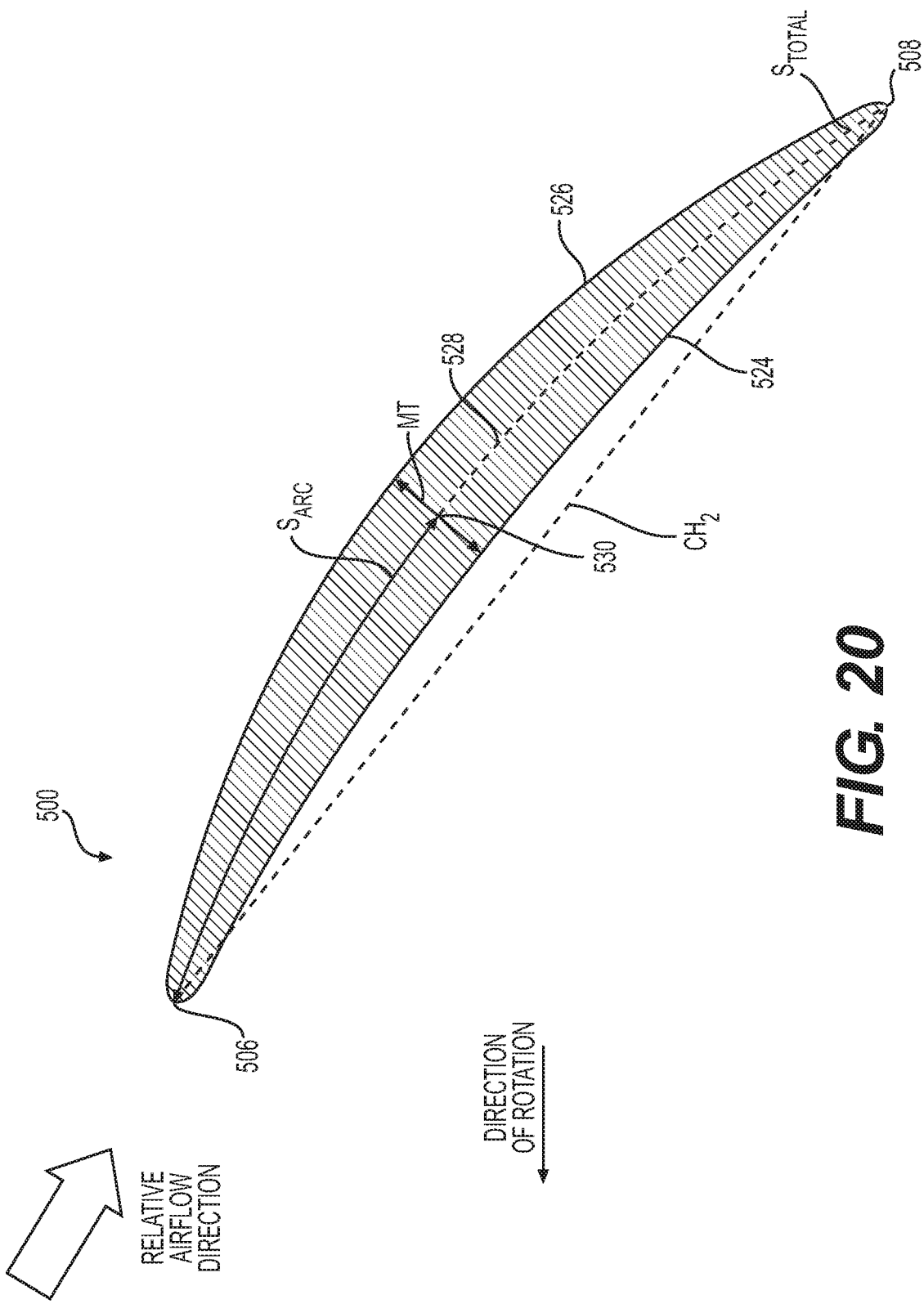
FIG. 20 is a cross-sectional view of the rotor blade of FIG. 19, taken along line 20-20 of FIG. 19.

With reference to FIG. 20, each of the airfoils 500 further includes a first principal face or a "pressure side" 524 and a second, opposing face or a "suction side" 526. The pressure side 524 and the suction side 526 extend in a chordwise direction along a chord line $CH_2$ and are opposed in a thickness direction normal to a mean camber line 528, and the mean camber line 528 is illustrated as a dashed line in FIG. 20 that extends from the leading edge 506 to the trailing edge 508. The pressure side 524 and the suction side 526 extend from the leading edge 506 to the trailing edge 508. In one example, each of the airfoils 500 is somewhat asymmetrical and may be cambered along the mean camber line 528, for example, each of the airfoils 500 may include the total camber distribution 302, 402. The pressure side 524 has a contoured, generally concave surface geometry, which gently bends or curves in three dimensions. The suction side 526 has a contoured, generally convex surface geometry, which likewise bends or curves in three dimensions. In other embodiments, the airfoils 500 may not be cambered and may be either symmetrical or asymmetrical.

In one example, at each spanwise location along the span S of each of the airfoils 500, each of the airfoils 500 has a total length or total arc distance $S_{Total}$ defined from the leading edge 506 to the trailing edge 508 along the mean camber line 528. In addition, at each spanwise location along the span S of each of the airfoils 500, each of the airfoils 500 has a first length or first arc distance $S_{Arc}$, which is defined as the arc distance along the mean camber line 528 from the leading edge 506 to a position 530 of local maximum thickness MT for the particular span S. Stated another way, for each spanwise location along the span S of the airfoils 500, the airfoil 500 has a position 530 or location of local maximum thickness LMT, which is defined as a ratio of the first arc distance $S_{Arc}$ along the mean camber line 528 associated with the respective spanwise location between the leading edge 506 and the location of the local maximum thickness LMT to the total arc distance $S_{Total}$ along the respective mean camber line 528 from the leading edge 506 to the trailing edge 508, or:

$$LMT = \frac{S_{Arc}}{S_{Total}} \quad (2)$$

Wherein, LMT is the location of local maximum thickness for the particular spanwise location of the airfoil 500; $S_{Arc}$ is the first arc distance defined along the mean camber line 528 between the leading edge 506 and the position 530 (FIG. 20) of the local maximum thickness MT for the particular spanwise location of the airfoil 500; and $S_{Total}$ is total arc distance along the mean camber line 528 from the leading edge 506 to the trailing edge 508 for the particular spanwise location of the airfoil 500. The local maximum thickness MT is the greatest distance between the pressure side 524 and the suction side 526 that is normal to the mean camber line 528 for the particular spanwise location. In this example, as will be discussed, the location of local maximum thickness (LMT) distribution 502 varies over the span S of the airfoils 500 to provide robustness to foreign object encounters without increasing a weight of the rotor blade 500, reducing flow capacity or impacting efficiency.

Figure 21:
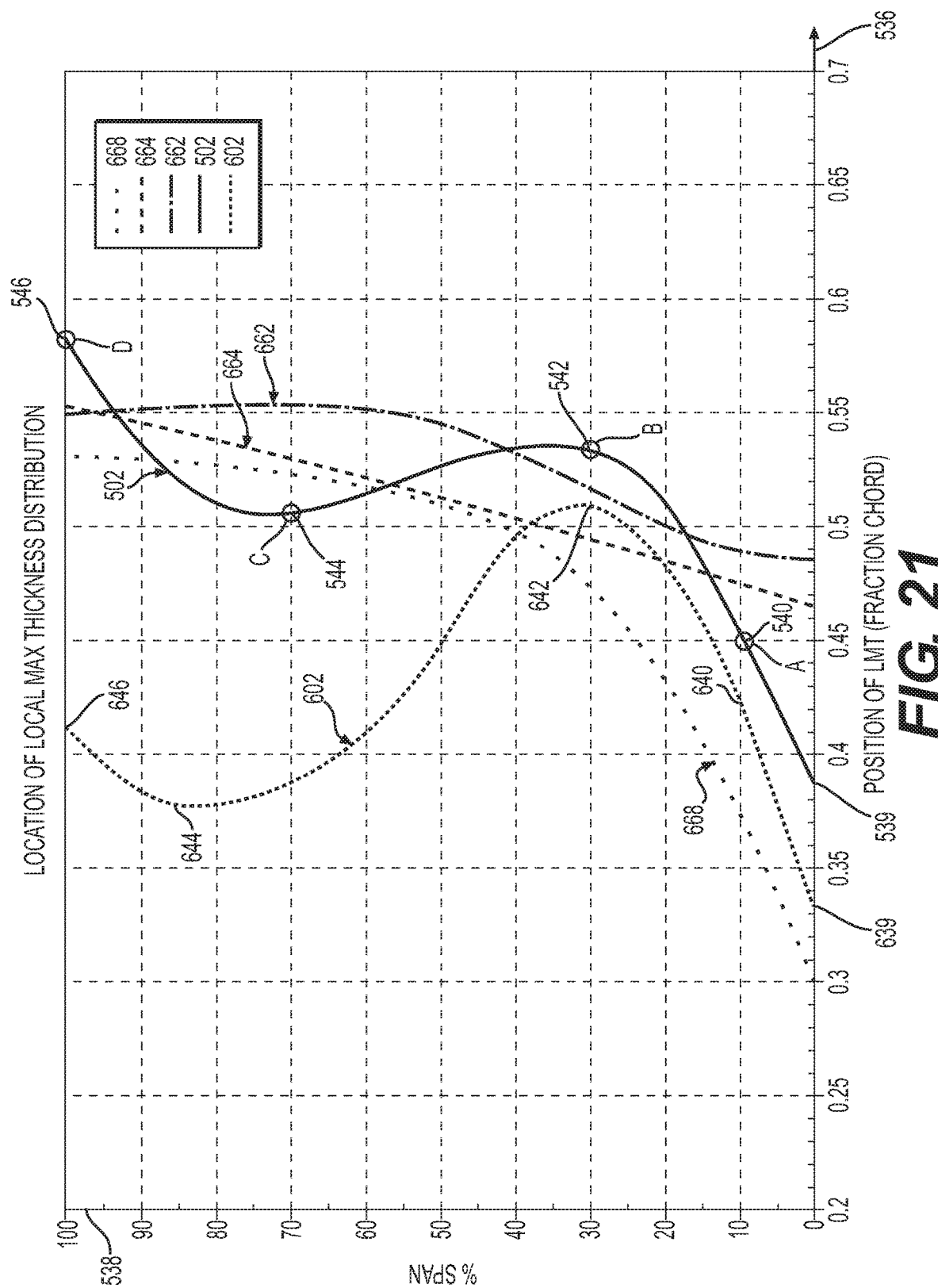
FIG. 21 is a graph of location of local maximum thickness (LMT; abscissa) versus percent span (ordinate) illustrating two exemplary spanwise location of local maximum thickness distributions associated with the rotor blade of FIG. 19.

In one example, with reference to FIG. 21, a graph shows the location of local maximum thickness (LMT) distribution 502 along the span S of each of the airfoils 500. In FIG. 21, the abscissa or horizontal axis 536 is the location of the local maximum thickness or LMT; and the ordinate or vertical axis 538 is the spanwise location or location along the span S of each of the airfoils 500 (span is 0% at the root 510 (FIG. 19) and span is 100% at the tip 512 (FIG. 19)).

Figure 22:
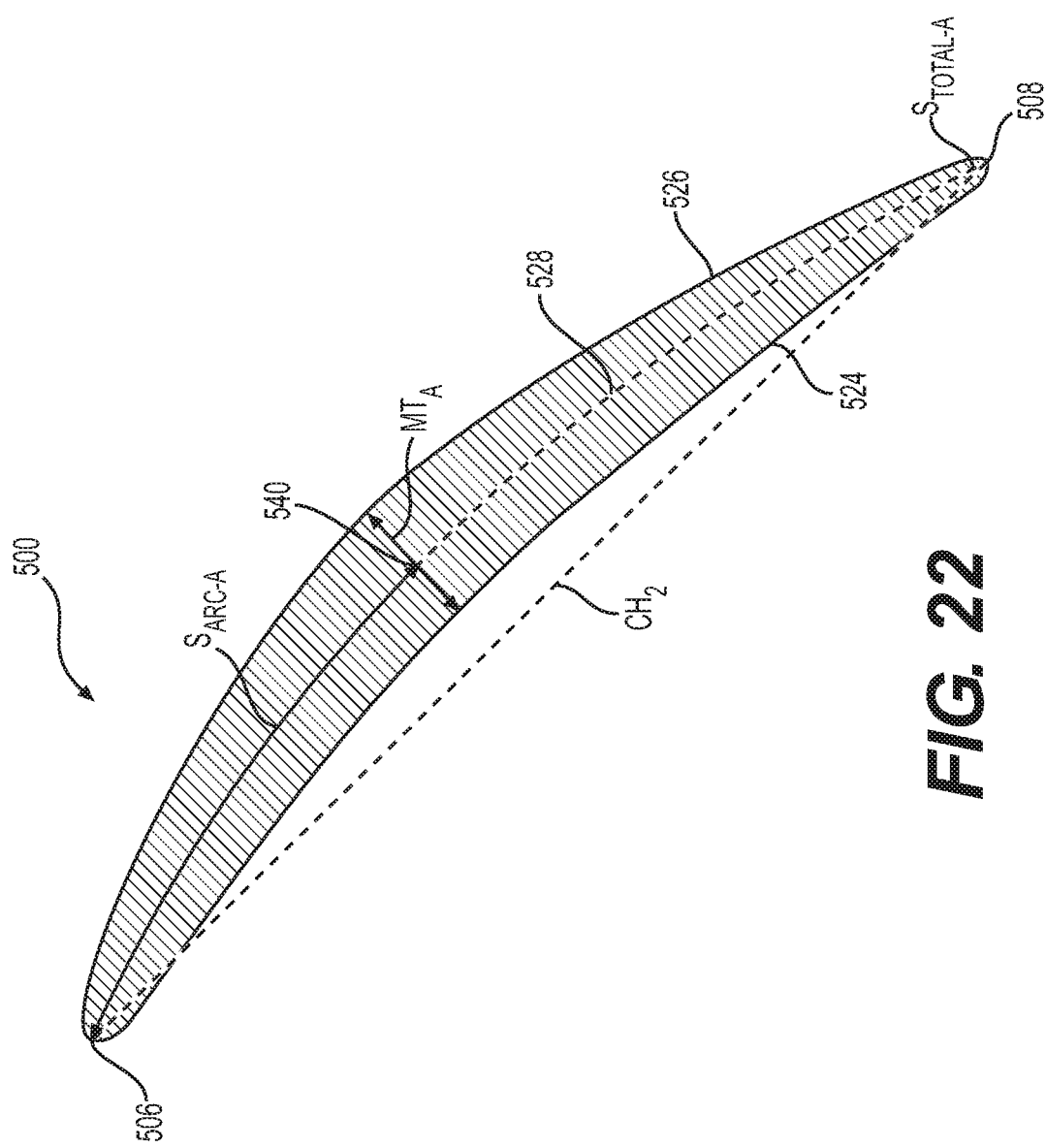
FIG. 22 is a cross-sectional view of the rotor blade of FIG. 19, taken along line 22-22 of FIG. 19, which illustrates a value of the location of local maximum thickness of the rotor blade at a spanwise location between 0% of the span and 10% of the span.

As shown in FIG. 21, the location of the local maximum thickness or LMT between 0% of the span and 10% of the span of each of the airfoils 500 increases from a position value 539 at the root or 0% span to a first position value 540. In one example, the position value 539 is about 0.35 to about 0.40, and in this example, the position value 539 is about 0.39 at 0% span. The first position value 540 of the location of the local maximum thickness or LMT is about 0.42 to about 0.47, and in this example, is about 0.45 at about 10% span of the airfoil 500. With reference to FIG. 22, the first position value 540 of the location of the local maximum thickness or LMT for each of the airfoils 500 is shown. FIG. 22 is a cross-sectional view through one of the airfoils 500, taken from line 22-22 of FIG. 19 into the page. As shown in FIG. 22, the first position value 540 of the location of the local maximum thickness or LMT is defined as the ratio between the first arc distance $S_{Arc-A}$ defined along the mean camber line 528 between the leading edge 506 and the position of the local maximum thickness $MT_A$ for the airfoil 500 between 0% of the span and 10% of the span; and $S_{Total-A}$ is total arc distance along the mean camber line 528 from the leading edge 506 to the trailing edge 508 for the airfoil 500 between 0% of the span and 10% of the span. In this example, the position value of the location of the local maximum thickness or LMT increases from the root or 0% span to the first position value 540, which is at 10% span.

Figure 23:
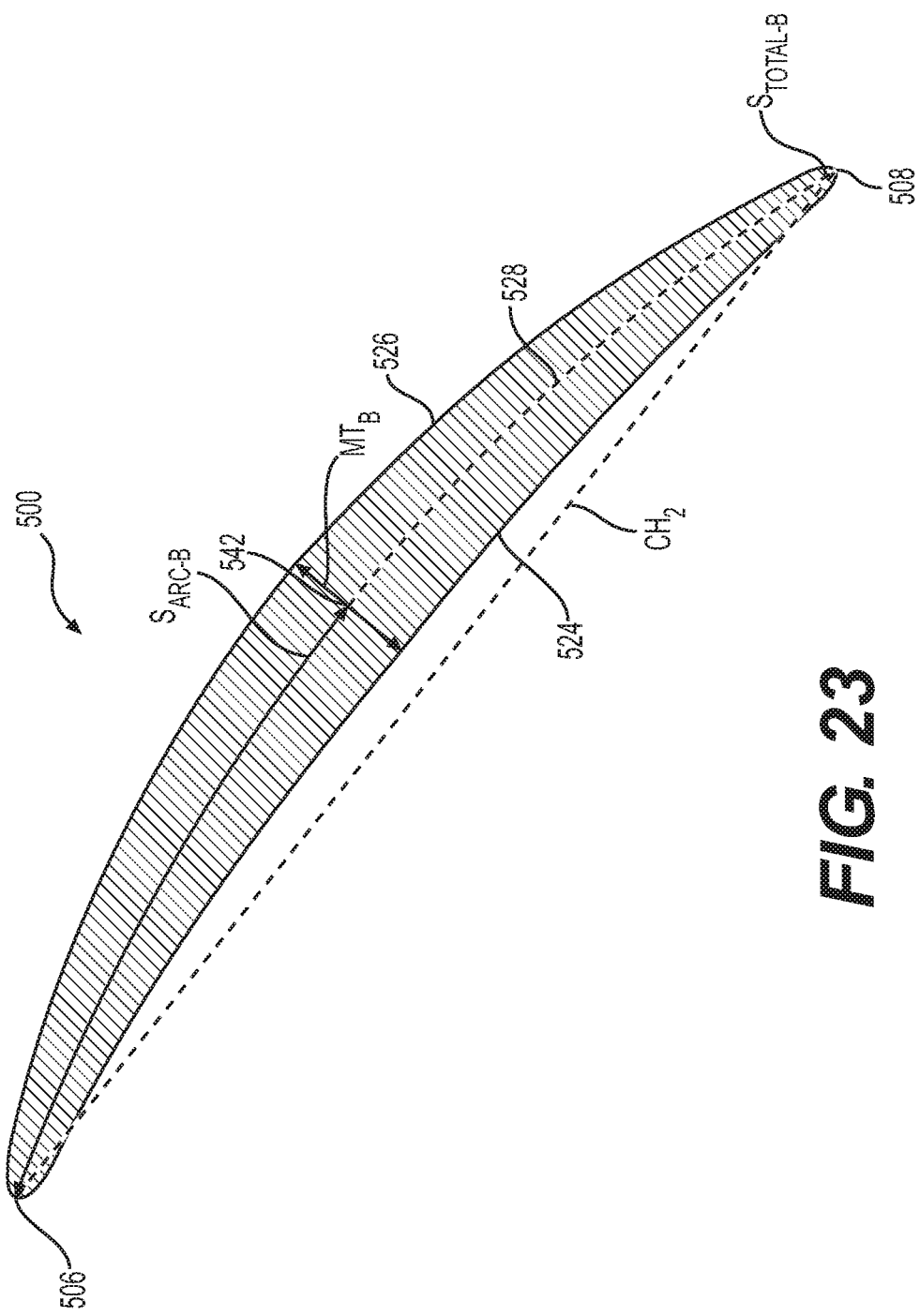
FIG. 23 is a cross-sectional view of the rotor blade of FIG. 19, taken along line 23-23 of FIG. 19, which illustrates a value of the location of local maximum thickness of the rotor blade at a spanwise location between 20% of the span and 50% of the span.

With reference back to FIG. 21, the location of the local maximum thickness or LMT between 20% of the span and 50% of the span of each of the airfoils 500 has a second position value 542. In one example, the second position value 542 of the location of the local maximum thickness or LMT is about 0.50 to about 0.55, and in this example, is about 0.53 at about 30% span of the airfoil 500. With reference to FIG. 23, the second position value 542 of the location of the local maximum thickness or LMT for each of the airfoils 500 is shown. FIG. 23 is a cross-sectional view through one of the airfoils 500, taken from line 23-23 of FIG. 19 into the page. As shown in FIG. 23, the second position value 542 of the location of the local maximum thickness or LMT is defined as the ratio between the first arc distance $S_{Arc-B}$ defined along the mean camber line 528 between the leading edge 506 and the position of the local maximum thickness $MT_B$ for the airfoil 500 between 20% of the span and 50% of the span; and $S_{Total-B}$ is total arc distance along the mean camber line 528 from the leading edge 506 to the trailing edge 508 for the airfoil 500 between 20% of the span and 50% of the span. Thus, in this example, from the first position value 540 of the location of the local maximum thickness or LMT, the position value of the location of the local maximum thickness or LMT increases to the second position value 542 at about 30% span.

Figure 24:
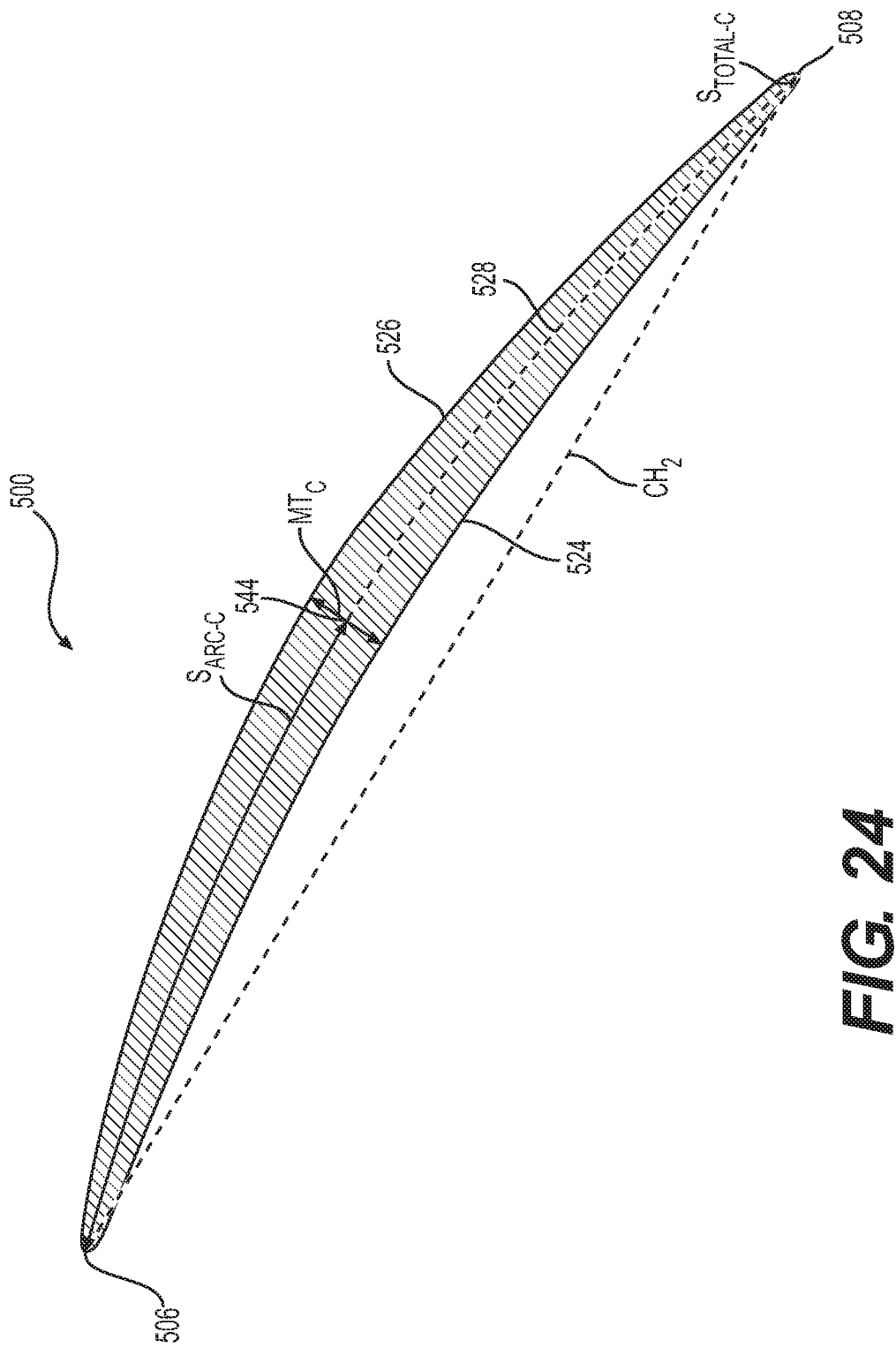
FIG. 24 is a cross-sectional view of the rotor blade of FIG. 19, taken along line 24-24 of FIG. 19, which illustrates a value of the location of local maximum thickness of the rotor blade at a spanwise location between 60% of the span and 90% of the span.

With reference back to FIG. 21, the location of the local maximum thickness or LMT between 60% of the span and 90% of the span of each of the airfoils 500 has a third position value 544. In one example, the third position value 544 of the location of the local maximum thickness or LMT is about 0.48 to about 0.52, and in this example, is about 0.51 at about 70% span of the airfoil 500. With reference to FIG. 24, the third position value 544 of the location of the local maximum thickness or LMT for each of the airfoils 500 is shown. FIG. 24 is a cross-sectional view through one of the airfoils 500, taken from line 24-24 of FIG. 19 into the page. As shown in FIG. 24, the third position value 544 of the location of the local maximum thickness or LMT is defined as the ratio between the first arc distance $S_{Arc-C}$ defined along the mean camber line 528 between the leading edge 506 and the position of the local maximum thickness $MT_C$ for the airfoil 500 between 60% of the span and 90% of the span; and $S_{Total-C}$ is total arc distance along the mean camber line 528 from the leading edge 506 to the trailing edge 508 for the airfoil 500 between 60% of the span and 90% of the span. In this example, from the second position value 542 of the location of the local maximum thickness or LMT, the position value of the location of the local maximum thickness or LMT decreases to the third position value 544 at about 70% span.

Figure 25:
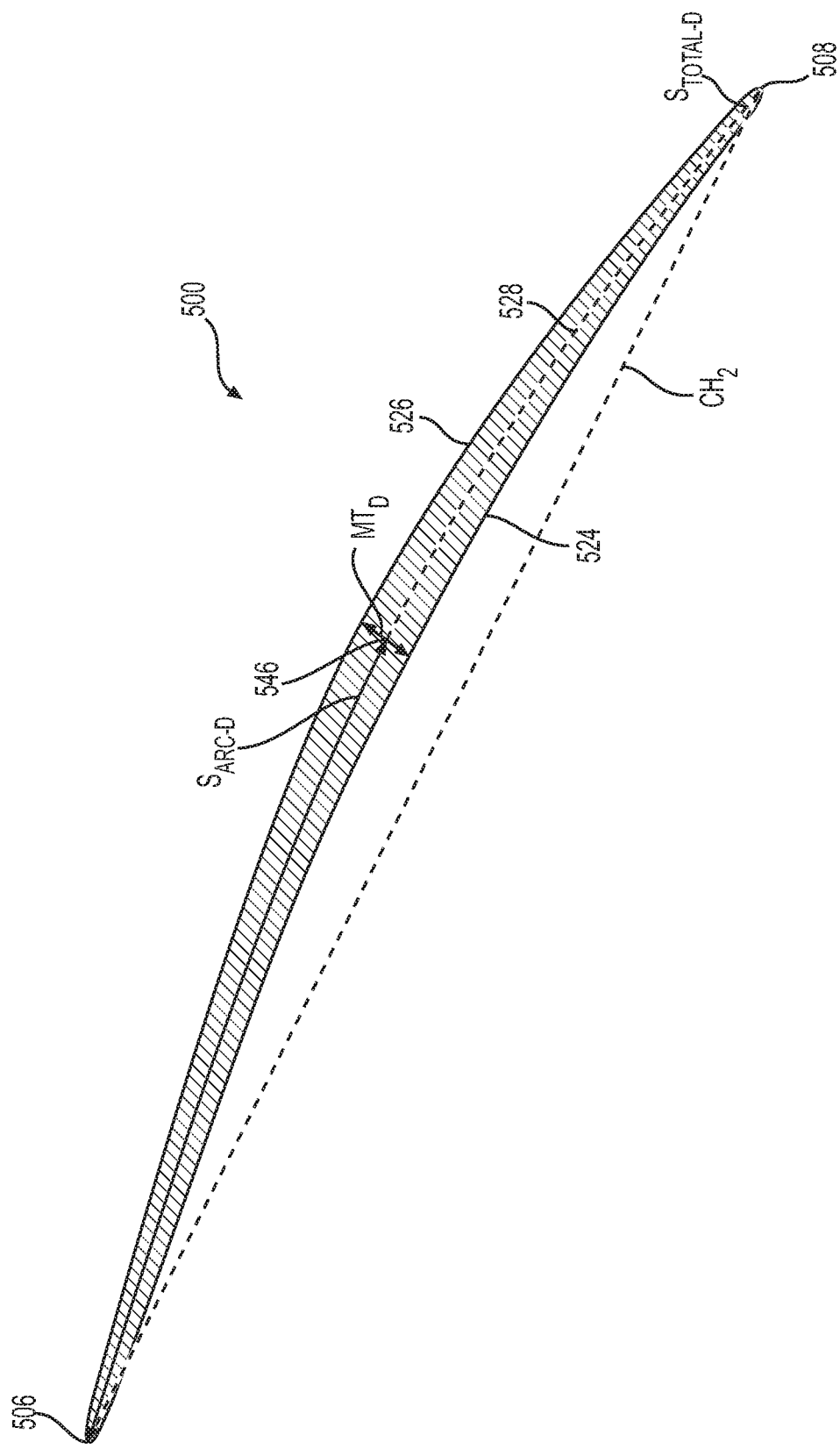
FIG. 25 is a cross-sectional view of the rotor blade of FIG. 19, taken along line 25-25 of FIG. 19, which illustrates a value of the location of local maximum thickness of the rotor blade at a spanwise location between 90% of the span and 100% of the span.

With reference back to FIG. 21, the location of the local maximum thickness or LMT between 90% of the span and 100% of the span or the tip 512 (FIG. 19) of each of the airfoils 500 has a fourth position value 546. In one example, the fourth position value 546 of the location of the local maximum thickness or LMT is about 0.55 to about 0.60, and in this example, is about 0.58 at about 100% span of the airfoil 500. With reference to FIG. 25, the fourth position value 546 of the location of the local maximum thickness or LMT for each of the airfoils 500 is shown. FIG. 25 is a cross-sectional view through one of the airfoils 500, taken from line 25-25 of FIG. 19 into the page. As shown in FIG. 25, the fourth position value 546 of the location of the local maximum thickness or LMT is defined as the ratio between the first arc distance $S_{Arc-D}$ defined along the mean camber line 528 between the leading edge 506 and the position of the local maximum thickness $MT_D$ for the airfoil 500 between 90% of the span and 100% of the span; and $S_{Total-D}$ is total arc distance along the mean camber line 528 from the leading edge 506 to the trailing edge 508 for the airfoil 500 between 90% of the span and 100% of the span. In this example, from the third position value 544 of the location of the local maximum thickness or LMT, the position value of the location of the local maximum thickness or LMT increases to the fourth position value 546 at about 100% span or the tip 512 (FIG. 19).

Figure 26:
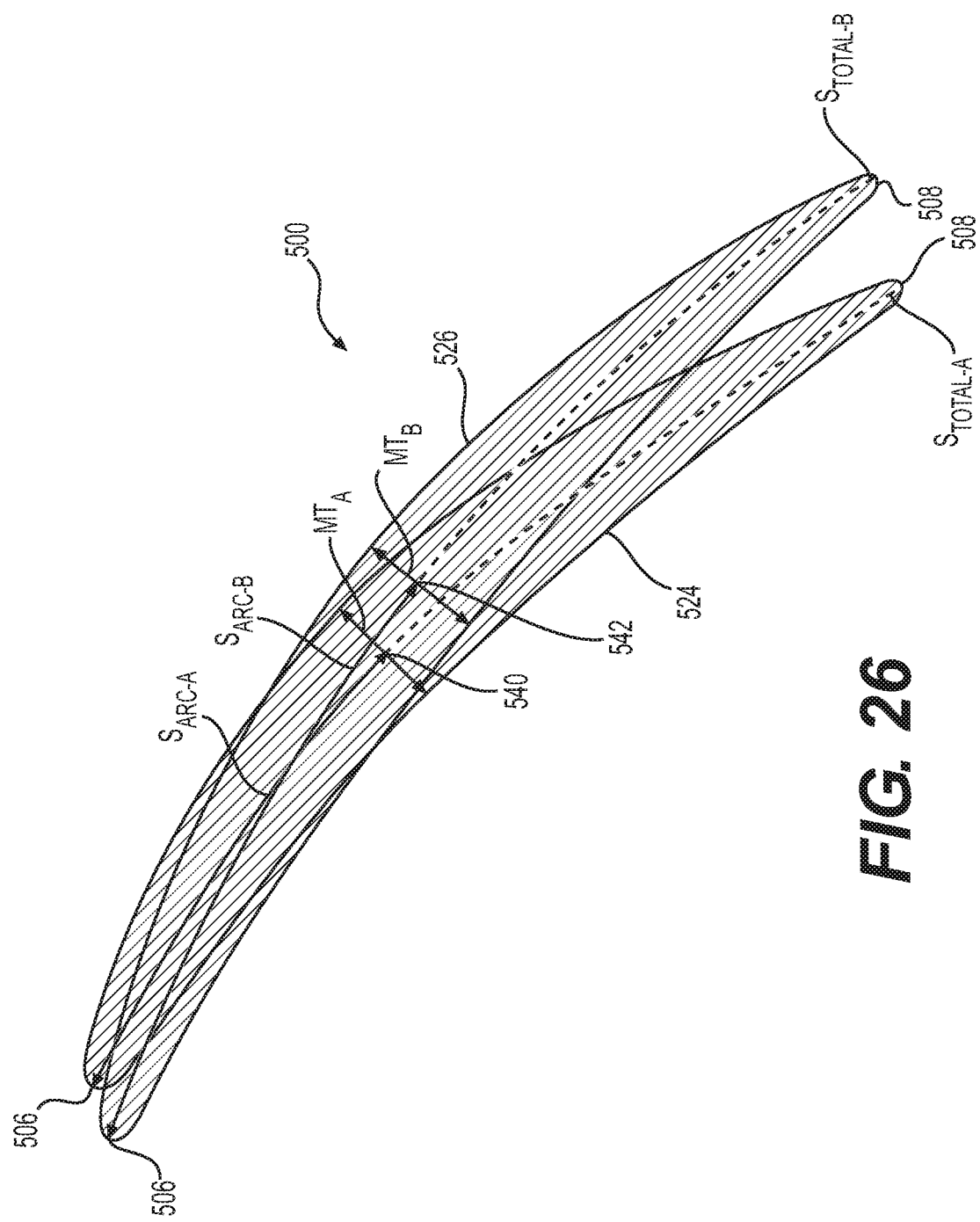
FIG. 26 is an overlay of the cross-sectional views of FIGS. 22 and 23, which illustrates a difference between the values of the location of local maximum thickness for a portion of the location of local maximum thickness distribution of the rotor blade.

With reference to FIG. 26, a portion of the location of local maximum thickness distribution 502 of one of the airfoils 500 is shown. FIG. 26 is an overlay of the cross-sectional views of FIGS. 22 and 23. As shown in FIG. 26, the location of local maximum thickness distribution 502 of each of the airfoils 500 increases from the first position value 540 at 10% span to the second position value 542 at 30% span. Thus, the first position value 540 is a first minimum value, and the location of local maximum thickness distribution 502 increases from the first minimum value to the second position value 542, which is a first maximum value. The first position value 540 is greater than the position value 539 at the root (0% span), which is an absolute minimum value.

Figure 27:
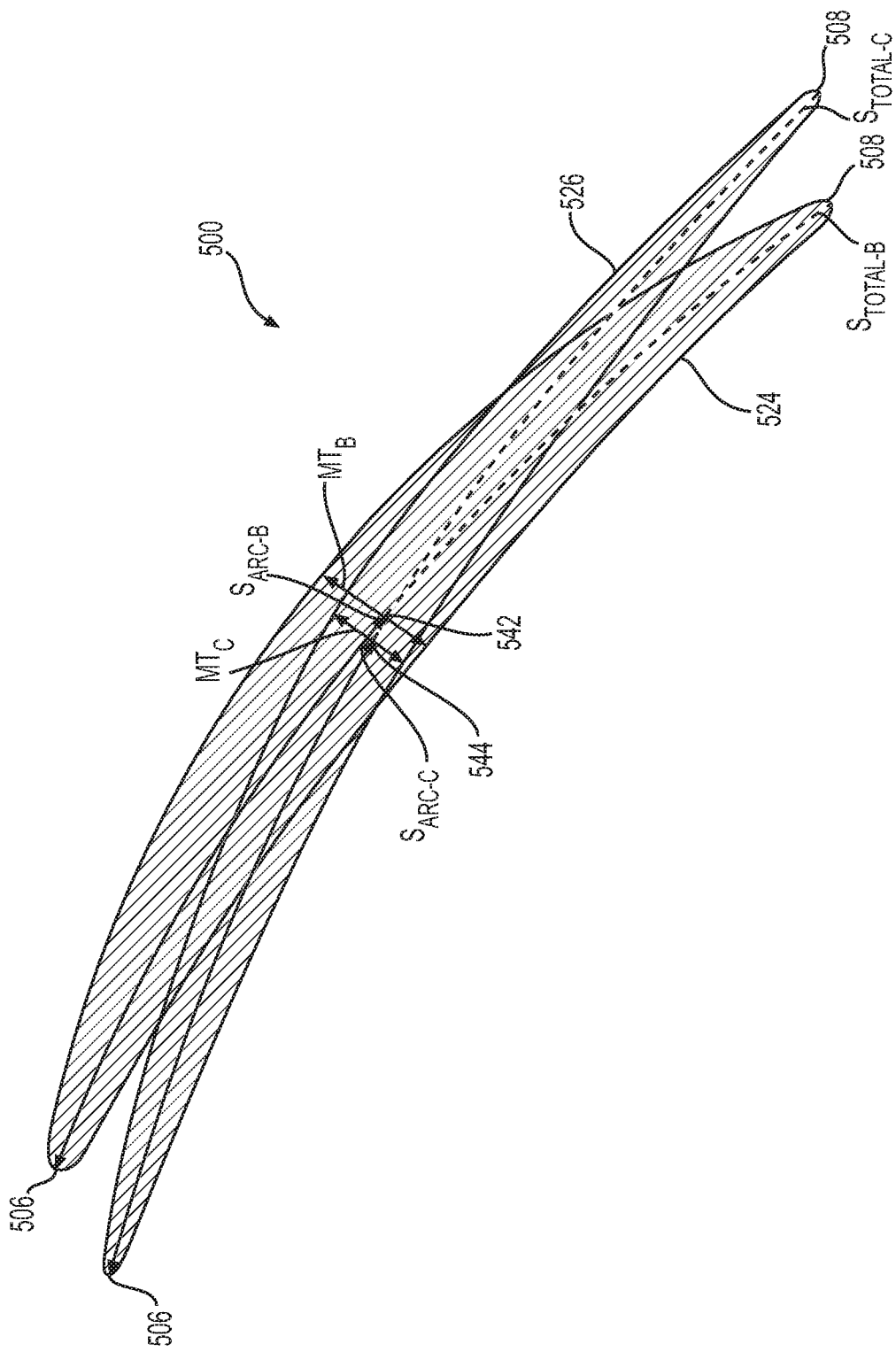
FIG. 27 is an overlay of the cross-sectional views of FIGS. 23 and 24, which illustrates a difference between the values of the location of local maximum thickness for a portion of the location of local maximum thickness distribution of the rotor blade.

With reference to FIG. 27, a portion of the location of local maximum thickness distribution 502 of one of the airfoils 500 is shown. FIG. 27 is an overlay of the cross-sectional views of FIGS. 23 and 24. As shown in FIG. 27, the location of local maximum thickness distribution 502 of each of the airfoils 500 decreases from the second position value 542 at 30% span to the third position value 544 at 70% span. Thus, the third position value 544 is a second minimum value, and the location of local maximum thickness distribution 502 decreases from the second position value 542 or the first maximum value at 30% span to the third position value 544.

Figure 28:
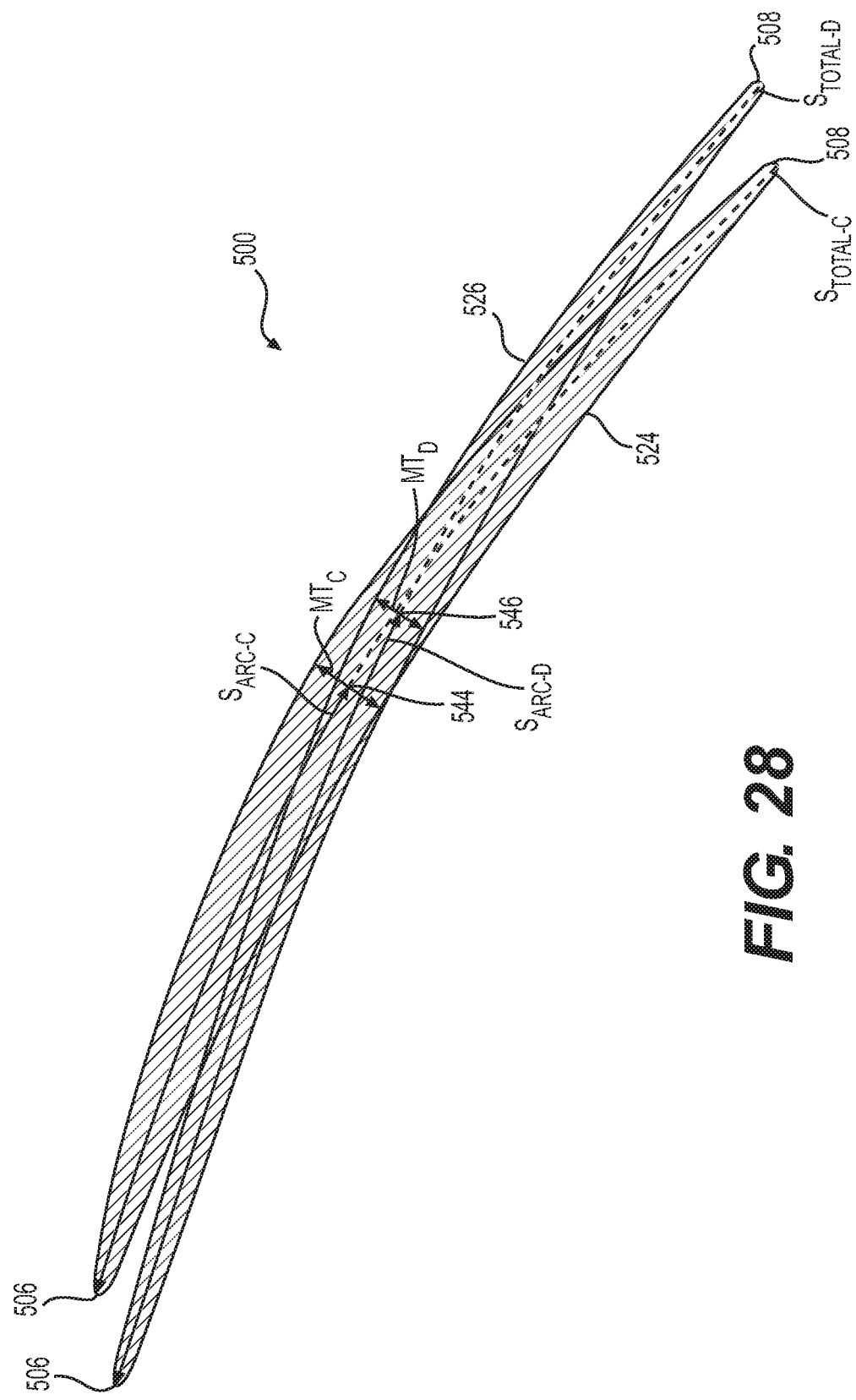
FIG. 28 is an overlay of the cross-sectional views of FIGS. 24 and 25, which illustrates a difference between the values of the location of local maximum thickness for a portion of the location of local maximum thickness distribution of the rotor blade.

With reference to FIG. 28, a portion of the location of local maximum thickness distribution 502 of one of the airfoils 500 is shown. FIG. 28 is an overlay of the cross-sectional views of FIGS. 24 and 25. As shown in FIG. 28, the location of local maximum thickness distribution 502 of each of the airfoils 500 increases from the third position value 544 at 70% span to the fourth position value 546 at 100% span. Thus, the fourth position value 546 is a second maximum value, and the location of local maximum thickness distribution 502 increases from the third position value 544 or the second minimum value at 70% span to the fourth position value 546. The fourth position value 546 is an absolute maximum value for the location of local maximum thickness or LMT.

With reference back to FIG. 21, the location of local maximum thickness distribution 502 has the position value 539 at 0% span (at the root 210 (FIG. 19)), and the value of the ratio (location of local maximum thickness or LMT) changes from 0% span to the first position value 540. The position value 539 is less than the first position value 540, and is the smallest or the absolute minimum position value for the location of local maximum thickness or LMT over the span S of the airfoil 500. The first position value 540 is at a spanwise location between 0% and 10% of the span, and in one example, is at 10% span. From the first position value 540, the value of the ratio (location of local maximum thickness or LMT) changes to the second position value 542, which is greater than the first position value 540 and the position value 539. The second position value 542 is at a spanwise location between 20% and 50% of the span, and in one example, is at 30% span. From the second position value 542, the value of the ratio (location of local maximum thickness or LMT) changes to the third position value 544, which is less than the second position value 542, but is greater than the first position value 540 and the position value 539. The third position value 544 is at a spanwise location between 60% and 90% of the span, and in one example, is at 70% span. From the third position value 544, value of the ratio (location of local maximum thickness or LMT) changes to the fourth position value 546, which is greater than the third position value 544, the second position value 542, the first position value 540 and the position value 539. The fourth position value 546 is at a spanwise location between 90% and 100% of the span, and in one example, is at 100% span. The fourth position value 546 is the absolute maximum position value for the location of local maximum thickness or LMT over the span S of the airfoil 500.

Generally, in this example, the location of local maximum thickness distribution 502 increases from 0% span to the first position value 540, and increases to the second position value 542. The location of local maximum thickness distribution 502 also decreases from the second position value 542 to the third position value 544. From the third position value 544, the location of local maximum thickness distribution 502 generally increases to the fourth position value 546. Stated another way, the value of the ratio that defines the location of local maximum thickness or LMT increases from the root to the second position value 542, decreases from the second position value 542 to the third position value 544 and increases to the fourth position value 546.

It will be understood that the location of local maximum thickness distribution 502 of the airfoils 500 described with regard to FIGS. 19-28 may be configured differently to provide robustness. In one example, with reference back to FIG. 21, the graph shows an exemplary location of local maximum thickness distribution 602 along the span S of each of the airfoils 500. For the location of local maximum thickness distribution 602, the location of the local maximum thickness or LMT between 0% of the span and 10% of the span of each of the airfoils 500 increases from a position value 639 at the root or 0% span to a first position value 640. In one example, the position value 639 is about 0.30 to about 0.35, and in this example, the position value 639 is about 0.34 at 0% span. The first position value 640 of the location of the local maximum thickness or LMT is about 0.40 to about 0.45, and in this example, is about 0.42 at about 10% span of the airfoil 500. Thus, the value of the location of the local maximum thickness or LMT increases from the root or 0% span to the first position value 640, which is at 10% span.

With continued reference to FIG. 21, for the location of local maximum thickness distribution 602, the location of the local maximum thickness or LMT between 20% of the span and 50% of the span of each of the airfoils 500 has a second position value 642. In one example, the second position value 642 of the location of the local maximum thickness or LMT is about 0.48 to about 0.54, and in this example, is about 0.51 at about 30% span of the airfoil 500. Thus, from the first position value 640 of the location of the local maximum thickness or LMT, the position value of the location of the local maximum thickness or LMT increases to the second position value 642 at about 30% span.

For the location of local maximum thickness distribution 602, the location of the local maximum thickness or LMT between 60% of the span and 90% of the span of each of the airfoils 500 has a third position value 644. In one example, the third position value 644 of the location of the local maximum thickness or LMT is about 0.35 to about 0.40, and in this example, is about 0.38 at about 85% span of the airfoil 500. In this example, from the second position value 642 of the location of the local maximum thickness or LMT, the position value of the location of the local maximum thickness or LMT decreases to the third position value 644 at about 85% span.

For the location of local maximum thickness distribution 602, the location of the local maximum thickness or LMT between 90% of the span and 100% of the span or the tip 512 (FIG. 19) of each of the airfoils 500 has a fourth position value 646. In one example, the fourth position value 646 of the location of the local maximum thickness or LMT is about 0.38 to about 0.44, and in this example, is about 0.41 at about 100% span of the airfoil 500. In this example, from the third position value 644 of the location of the local maximum thickness or LMT, a value of the location of the local maximum thickness or LMT increases to the fourth position value 646 at about 100% span or the tip 512 (FIG. 19).

Thus, the location of local maximum thickness distribution 602 has the position value 639 at 0% span (at the root 510 (FIG. 19)), and value of the ratio (location of local maximum thickness or LMT) changes from 0% span to the first position value 640. The position value 639 is less than the first position value 640, and is the smallest or an absolute minimum position value for the location of local maximum thickness or LMT over the span S of the airfoil 500 for the location of local maximum thickness distribution 602. The first position value 640 is at a spanwise location between 0% and 10% of the span, and in one example, is at 10% span. From the first position value 640, the value of the ratio (location of local maximum thickness or LMT) changes to the second position value 642, which is greater than the first position value 640 and the position value 639. The second position value 642 is at a spanwise location between 20% and 50% of the span, and in one example, is at 30% span. From the second position value 642, the value of the ratio (location of local maximum thickness or LMT) changes to the third position value 644, which is less than the second position value 642, but is greater than the position value 639. The third position value 644 is at a spanwise location between 60% and 90% of the span, and in one example, is at 85% span. From the third position value 644, the value of the ratio (location of local maximum thickness or LMT) changes to the fourth position value 646, which is greater than the third position value 644. The fourth position value 646 is less than the second position value 642 and the first position value 640. The fourth position value 646 is greater than the position value 639. The fourth position value 646 is at a spanwise location between 90% and 100% of the span, and in one example, is at 100% span. In this example, the second position value 642 is an absolute maximum position value for the value of the ratio (location of local maximum thickness or LMT) over the span S of the airfoil 500 for the location of local maximum thickness distribution 602.

Generally, in this example, the location of local maximum thickness distribution 602 increases from 0% span to the first position value 640, and increases to the second position value 642. The location of local maximum thickness distribution 602 also decreases from the second position value 642 to the third position value 644. From the third position value 644, the location of local maximum thickness distribution 602 generally increases to the fourth position value 646. Stated another way, the value of the ratio that defines the location of local maximum thickness or LMT increases from the root to the second position value 642, decreases from the second position value 642 to the third position value 644 and increases to the fourth position value 646.

It should be noted that the increases and decreases in the location of local maximum thickness or LMT of the location of local maximum thickness distribution 502 or the location of local maximum thickness distribution 602 of one or more of the airfoils 500 may not be as shown in FIG. 21. Rather, one or more of the changes in the location of the local maximum thickness or LMT may include a local increase or a local decrease before the location of the local maximum thickness or LMT changes between the various position values 539, 540, 542, 544, 546; 639, 640, 642, 644, 646.

With continued reference to FIG. 21, by providing the location of local maximum thickness distribution 502, 602 with the value of the ratio (location of local maximum thickness LMT) that increases from the root to a position value 542, 642, decreases from the position value 542, 642 to a position value 544, 644 and increases from the position value 544, 644 to the position value 546, 646 at the tip or 100% span and the position value 542, 642 is at a spanwise location within 20% to 50% of the span in contrast to conventional location of maximum thickness distributions 662, 664 and 668, the airfoil 500 has material positioned where it may reduce permanent deformation due to foreign object encounters, without increasing the weight of the airfoil 500 or reducing flow capacity or efficiency of the rotor 200. By providing the location of local maximum thickness distribution 502, 602 that each decrease from the position value 542, 642 at a spanwise location within 20% to 50% of the span and then increase to the tip or 100% span, the airfoil 500 has improved robustness without increasing a weight of the airfoil 500. By providing the position value 542, 642 at a spanwise location within 20% to 50% of the span, the location of local maximum thickness distributions 502, 602 of the present disclosure improve robustness of the airfoil 300 without reducing flow capacity or efficiency of the rotor 200.

With each of the airfoils 500 formed with the location of local maximum thickness distribution 502 or the location of local maximum thickness distribution 602, the airfoils 500 are coupled to the rotor hub 222 to form the rotor 200. With the rotor 200 formed, the rotor 200 is installed in the gas turbine engine 100 (FIG. 1). In general, the rotor 200 may be incorporated into one or more of the engine sections described with regard to FIG. 1 above. For example and additionally referring to FIG. 1, the rotor 200 may be incorporated into the fan section 102 such that, as the rotor 200 rotates, the airfoils 500 function to draw air into the gas turbine engine 100 with increased robustness to foreign object encounters.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A rotor for a compressor, comprising:
a hub; and
a plurality of airfoils having a root, a tip opposite the root and a span that extends from 0% at the root to 100% at the tip, each of the plurality of airfoils coupled to the hub at the root and spaced apart from adjacent ones of the plurality of airfoils over the span by a throat dimension defined between the adjacent ones of the plurality of airfoils, the throat dimension has a maximum value at a spanwise location between 60% of the span and 90% of the span of the adjacent ones of the plurality of airfoils, and the throat dimension between 90% of the span and the tip of the adjacent ones of the plurality of airfoils has a first value that is less than 70% of the maximum value.

2. The rotor of claim 1, wherein the throat dimension between the root and 20% of the span of the adjacent ones of the plurality of airfoils has a second value that is less than 60% of the maximum value.

3. The rotor of claim 1, wherein the throat dimension between the root and 20% of the span of the adjacent ones of the plurality of airfoils has a second value, and the second value is less than the first value.

4. The rotor of claim 3, wherein the second value is between the root and 5% of the span of the adjacent ones of the plurality of airfoils.

5. The rotor of claim 1, wherein the maximum value is between about 70% and 80% of the span of the adjacent ones of the plurality of airfoils.

6. The rotor of claim 1, wherein the throat dimension decreases from the maximum value to the tip.

7. The rotor of claim 1, wherein the throat dimension at 5% of the span of the adjacent ones of the plurality of airfoils is less than 70% of the maximum value.

8. A rotor for a compressor, comprising:
a hub; and
a plurality of airfoils having a root, a tip opposite the root and a span that extends from 0% at the root to 100% at the tip, each of the plurality of airfoils coupled to the hub at the root and spaced apart from adjacent ones of the plurality of airfoils over the span by a throat dimension defined between the adjacent ones of the plurality of airfoils, the throat dimension has a maximum value at a spanwise location between 60% of the span and 90% of the span of the adjacent ones of the plurality of airfoils, the throat dimension between 90% of the span and the tip of the adjacent ones of the plurality of airfoils has a first value, and the throat dimension between the root and 10% of the span of the adjacent ones of the plurality of airfoils has a second value that is less than 60% of the maximum value.

9. The rotor of claim 8, wherein the second value is less than the first value.

10. The rotor of claim 8, wherein the first value is less than 70% of the maximum value.

11. The rotor of claim 8, wherein the second value is between the root and 5% of the span of the adjacent ones of the plurality of airfoils.

12. The rotor of claim 8, wherein the maximum value is between about 70% and 80% of the span of the adjacent ones of the plurality of airfoils.

13. The rotor of claim 8, wherein the first value is greater than 60% of the maximum value.

14. A rotor for a compressor, comprising:
a hub; and
a plurality of airfoils having a root, a tip opposite the root and a span that extends from 0% at the root to 100% at the tip, each of the plurality of airfoils coupled to the hub at the root and spaced apart from adjacent ones of the plurality of airfoils over the span by a throat dimension defined between the adjacent ones of the plurality of airfoils, the throat dimension has a maximum value at a spanwise location between 60% of the span and 90% of the span of the adjacent ones of the plurality of airfoils, the throat dimension between 90% of the span and the tip of the adjacent ones of the plurality of airfoils has a first value, the throat dimension between the root and 10% of the span of the adjacent ones of the plurality of airfoils has a second value that is less than 70% of the maximum value and the second value is less than the first value and the first value is less than 70% of the maximum value.

15. The rotor of claim 14, wherein the second value is between the root and 5% of the span of the adjacent ones of the plurality of airfoils.

16. The rotor of claim 14, wherein the maximum value is between about 70% and 80% of the span of the adjacent ones of the plurality of airfoils.

17. The rotor of claim 14, wherein the first value is greater than 60% of the maximum value.

18. The rotor of claim 14, wherein the throat dimension has a third value at the root, which is less than the second value.

* * * * *